(12) United States Patent
Park et al.

(10) Patent No.: US 10,455,589 B2
(45) Date of Patent: Oct. 22, 2019

(54) APPARATUS AND METHOD FOR RANDOM ACCESS IN WIRELESS COMMUNICATION SYSTEM

(71) Applicants: Samsung Electronics Co., Ltd., Suwon-si, Gyeonggi-do (KR); RESEARCH & BUSINESS FOUNTDATION SUNGKYUNKWAN UNIVERSITY, Suwon-si, Gyeonggi-do (KR)

(72) Inventors: Seung-Hoon Park, Seoul (KR); Min-Young Chung, Seoul (KR); Jun-Suk Kim, Siheung-si (KR); Sunheui Ryoo, Yongin-si (KR); Byounghoon Jung, Seoul (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/572,909

(22) PCT Filed: May 13, 2016

(86) PCT No.: PCT/KR2016/005058
§ 371 (c)(1),
(2) Date: Nov. 9, 2017

(87) PCT Pub. No.: WO2016/186385
PCT Pub. Date: Nov. 24, 2016

(65) Prior Publication Data
US 2018/0139759 A1 May 17, 2018

(30) Foreign Application Priority Data
May 15, 2015 (KR) .................. 10-2015-0068066

(51) Int. Cl.
H04W 72/04 (2009.01)
H04W 28/02 (2009.01)
(Continued)

(52) U.S. Cl.
CPC ... *H04W 72/0486* (2013.01); *H04W 28/0215* (2013.01); *H04W 72/042* (2013.01);
(Continued)

(58) Field of Classification Search
CPC ......... H04W 72/0486; H04W 28/0215; H04W 72/042; H04W 72/085; H04W 72/14; H04W 74/004
See application file for complete search history.

(56) References Cited

U.S. PATENT DOCUMENTS

2007/0183361 A1　8/2007　Damnjanovic et al.
2010/0035581 A1　2/2010　Park et al.
(Continued)

FOREIGN PATENT DOCUMENTS

KR　10-2008-0099316 A　11/2008
KR　10-2009-0033005 A　4/2009
(Continued)

OTHER PUBLICATIONS

ISA/KR, "International Search Report," Application No. PCT/KR2016/005058, dated Aug. 17, 2016, 5 pages.
(Continued)

*Primary Examiner* — Chi H Pham
*Assistant Examiner* — Weibin Huang

(57) ABSTRACT

The present disclosure relates to a $5^{th}$ generation (5G) or pre-5G communication system for supporting a high data transmission rate beyond a $4^{th}$ generation communication system such as long term evolution (LTE). An operation method of a base station in a wireless communication system according to an embodiment of the present invention
(Continued)

comprises the steps of: receiving at least one random access preamble from at least one terminal; and transmitting at least one message including a plurality of random access responses corresponding to the at least one random access preamble.

19 Claims, 37 Drawing Sheets

(51) Int. Cl.
*H04W 72/08* (2009.01)
*H04W 72/14* (2009.01)
*H04W 74/00* (2009.01)
*H04W 74/08* (2009.01)

(52) U.S. Cl.
CPC ......... *H04W 72/085* (2013.01); *H04W 72/14* (2013.01); *H04W 74/004* (2013.01); *H04W 74/0833* (2013.01)

(56) References Cited

U.S. PATENT DOCUMENTS

| | | | |
|---|---|---|---|
| 2010/0195640 | A1 | 8/2010 | Park et al. |
| 2010/0278114 | A1* | 11/2010 | Kwon ............... H04L 1/0006 370/328 |
| 2013/0021993 | A1* | 1/2013 | Chou ............... H04W 56/0045 370/329 |
| 2014/0079011 | A1 | 3/2014 | Wiberg et al. |
| 2014/0153417 | A1* | 6/2014 | Gupta ............... H04W 52/0219 370/252 |
| 2015/0023281 | A1* | 1/2015 | Wu ............... H04W 72/0473 370/329 |
| 2015/0078264 | A1* | 3/2015 | Han ............... H04W 74/0833 370/329 |
| 2015/0327198 | A1* | 11/2015 | Axmon ............... H04W 56/0045 370/336 |
| 2016/0302234 | A1* | 10/2016 | Martinez Tarradell ...... H04W 74/006 |
| 2016/0309516 | A1* | 10/2016 | Wong ............... H04W 74/0833 |
| 2017/0019930 | A1* | 1/2017 | Lee ............... H04W 74/0833 |
| 2017/0078933 | A1* | 3/2017 | Li ............... H04W 36/0077 |
| 2018/0027595 | A1* | 1/2018 | Wang ............... H04L 12/413 370/329 |

FOREIGN PATENT DOCUMENTS

| | | |
|---|---|---|
| KR | 10-0939722 B1 | 2/2010 |
| KR | 10-2015-0042689 A | 4/2015 |
| WO | 2010-124228 A2 | 10/2010 |

OTHER PUBLICATIONS

ISA/KR, "Written Opinion of the International Searching Authority," Application No. PCT/KR2016/005058, dated Aug. 17, 2016, 5 pages.

3GPP TR 37.868 V11.0.0 (Sep. 2011), 3rd Generation Partnership Project; Technical Specification Group Radio Access Network; Study on RAN Improvements for Machine-type Communications; (Release 11), 28 pages.

3GPP TS 36300 v12.2.0 (Jun. 2014), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 215 pages.

3GPP TS 36.321 v12.2.1 (Jun. 2014), 3rd Generation Partnership Project; Technical Specification Group Radio Access Network; Evolved Universal Terrestrial Radio Access (E-UTRA); Medium Access Control (MAC) protocol specification (Release 12), 57 pages.

Intel Corporation, "Discussion on UE complexity reduction for eMTC," R1-143768, 3GPP TSG RAN WG1 Meeting #78bis, Ljubljana, Slovenia, Oct. 6-10, 2014, 6 pages.

Intel Corporation, "Discussion on common control message enhancement for eMTC," R1-143772, 3GPP TSG RAN WG1 Meeting #78bis, Ljubljana, Slovenia, Oct. 6-10, 2014, 6 pages.

Ericsson, "Rel-12 agreements for MTC," R1-143784, 3GPP TSG-RAN WG1 Meeting #78bis, Ljubljana, Slovenia, Oct. 6-10, 2014, 7 pages.

Ericsson, "UE complexity reduction for MTC," R1-143785, 3GPP TSG-RAN WG1 Meeting #78bis, Ljubljana, Slovenia, Oct. 6-10, 2014, 6 pages.

Ericsson, "Data associated channels for MTC," R1-143788, 3GPP TSG-RAN WG1 Meeting #78bis, Ljubljana, Slovenia, Oct. 6-10, 2014, 5 pages.

Ericsson, "Common control messages for MTC," R1-143789, 3GPP TSG-RAN WG1 Meeting #78bis, Ljubljana, Slovenia, Oct. 6-10, 2014, 6 pages.

Ericsson, "RAR and Paging for MTC," R1-144562, 3GPP TSG RAN WG1 Meeting #79, San Francisco, USA, Nov. 17-21, 2014, 7 pages.

Fujitsu, "The impacts on RAR caused by preamble repetition," R1-144782, 3GPP TSG RAN WG1 Meeting #79, San Francisco, USA, Nov. 17-21, 2014, 3 pages.

MCC Support, "Draft Report of 3GPP TSG RAN WG1 #79 v0.1.0 (San Francisco, USA, Nov. 17-21, 2014)," R1-15xxxx, 3GPP TSG RAN WG1 Meeting #80, Athens, Greece, Feb. 9-13, 2015, 79 pages.

* cited by examiner

APPARATUS AND METHOD FOR RANDOM ACCESS IN WIRELESS COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/005058 filed May 13, 2016, which claims the benefit of Korean Patent Application No. 10-2015-0068066 filed May 15, 2015, the disclosures of which are fully incorporated herein by reference into the present disclosure as if fully set forth herein.

TECHNICAL FIELD

The present disclosure relates to technology for random access in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Therefore, embodiments of the present disclosure provide an apparatus and a method for mitigating congestion in random access caused when a plurality of terminals attempts random access to at least one base station in a wireless communication system.

Embodiments of the present disclosure provide an apparatus and a method for transmitting, to a plurality of terminals in a wireless communication system, a plurality of Random Access Response (RAR) messages in response to at least one random access preamble identified by the at least one base station without increasing the number of random access preambles respectively transmitted by the plurality of terminals.

Embodiments of the present disclosure provide an apparatus and a method for avoiding a collision between msg3 messages respectively transmitted from the plurality of terminals when the plurality of terminals transmit the same preamble to one base station in a wireless communication system.

An operation method of a base station in a wireless communication system according to an embodiment of the present disclosure includes: receiving at least one random access preamble from at least one terminal; and transmitting at least one message including a plurality of random access responses corresponding to the at least one random access preamble.

An operation method of a terminal in a wireless communication system according to an embodiment of the present disclosure includes: transmitting a random access preamble selected from a plurality of random access preambles to a base station; and receiving at least one message including a plurality of random access responses corresponding to the selected random access preamble.

An apparatus of a base station in a wireless communication system according to an embodiment of the present disclosure includes: a reception unit configured to receive at least one random access preamble from at least one terminal; a control unit configured to generate at least one message including a plurality of random access responses corresponding to the at least one random access preamble; and a transmission unit configured to transmit the at least one message.

An apparatus of a terminal in a wireless communication system according to an embodiment of the present disclosure includes: a transmission unit configured to transmit a random access preamble selected from a plurality of random access preambles to a base station; and a reception unit configured to receive at least one message including a plurality of random access responses corresponding to the selected random access preamble.

DETAILED DESCRIPTION

Hereinafter, the operating principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

Hereinafter, the present disclosure describes a technique for allocating uplink resources in a wireless communication system.

Figure 1:
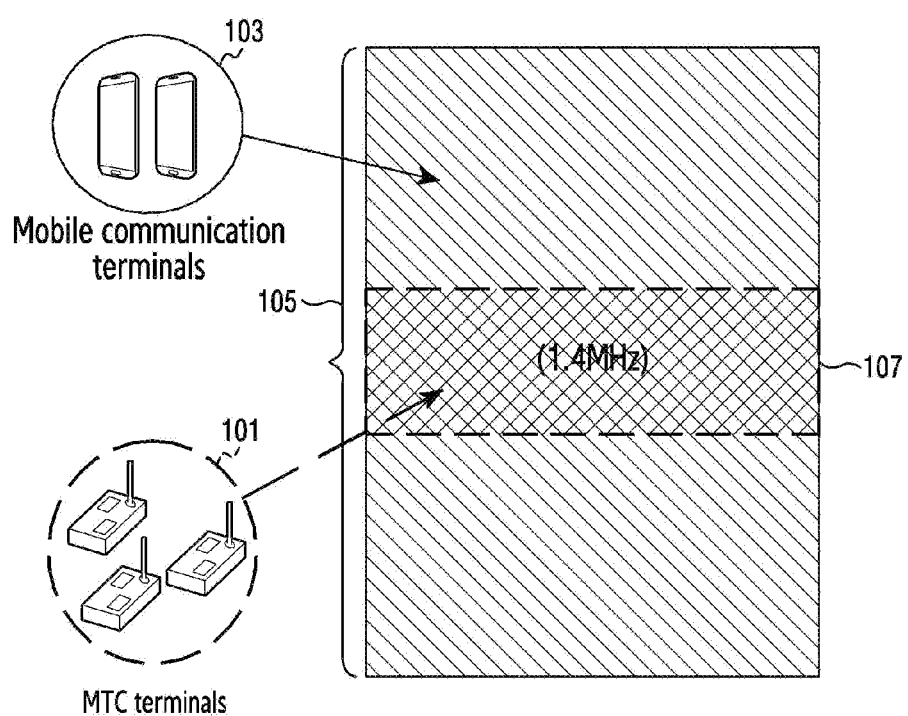
FIG. 1 illustrates a frequency band used by a mobile communication terminal and a frequency band used by a MTC terminal.

For the standardization of 3GPP Rel-13, discussions are currently being conducted on a selected work item of reducing the complexity and cost of a Machine-Type Communications (MTC) terminal. For example, referring to FIG. 1, MTC terminals 101 use a single RF antenna to reduce the complexity of the MTC terminals 101 and support half-duplex bidirectional communication. In addition, while mobile communication terminals 103 use all resources in the entire system band 105, the MTC terminals 101 may use a 1.4-MHz narrowband 107 in the entire system band 105. Since the MTC terminals 101 use the 1.4-MHz narrowband 107, the hardware cost of the MTC terminals 101 may be reduced.

Figure 2:
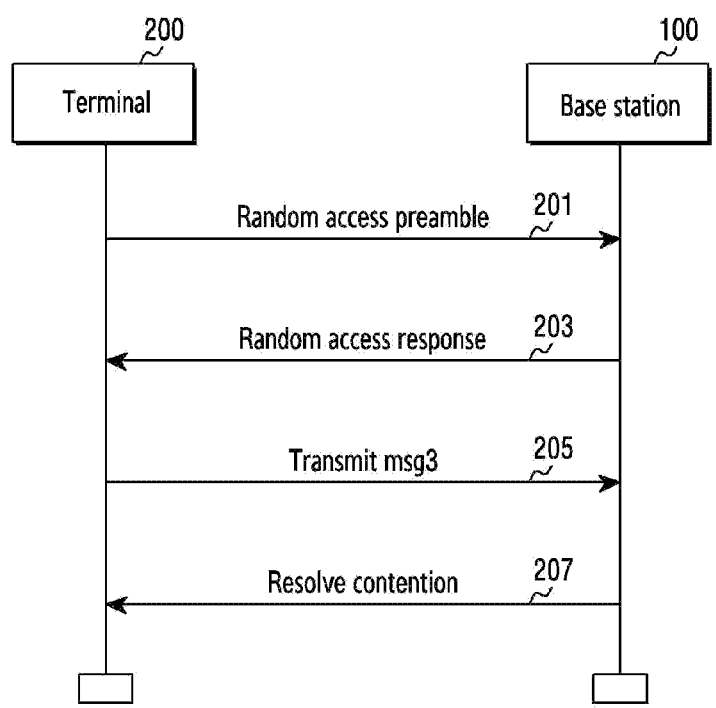
FIG. 2 illustrates a random access procedure of a terminal.

The mobile communication terminals 103 and the MTC terminals 101 may perform a random access procedure to access a network. For example, referring to FIG. 2, a terminal 200 transmits (201) a random access preamble to a base station 100. Specifically, the terminal 200 may receive a System Information Block (SIB) from the base station 100. The terminal 200 may select a channel for transmitting the random access preamble based on the SIB.

The terminal 200 may arbitrarily select the indices of a subframe and a Physical Random Access Channel (PRACH) that are a position where the random access preamble is to be transmitted. A Random Access-Radio Network Temporary Identifier (RA-RNTI) may be determined depending on the transmission position for the random access preamble selected by the UE. The base station 100 and the terminal 200 may identify the transmission position for the specific random access preamble through the RA-RNTI. Also, the terminal 200 may arbitrarily select one random access preamble for use in random access transmission among a total of 64 orthogonal random access preambles. The terminal 200 may transmit the random access preamble to the base station 100 through the selected PRACH.

After receiving the random access preamble transmitted from the terminal 200, the base station 100 transmits (203) a Random Access Response (RAR) message to the terminal 200. The base station 100 may detect the PRACH to detect the random access preamble transmitted from the terminal 200. The base station 100 transmits (203), to the terminal 200, the RAR message including a Random Access Preamble Identifier (RAPID) for identifying a random access preamble, UpLink (UL)-Grant information, which is radio resource allocation information for transmitting a message (for example, msg3), and a temporary Cell-RNTI (C-RNTI), which is a temporary identifier assigned to the terminal 200. The base station 100 may multiplex RAR messages respectively relative to all random access preambles identified through the PRACH into one MAC Protocol Data Unit (PDU) message. The base station 100 may transmit the MAC PDU message including the RAR messages to the terminal 200 through a Physical Downlink Control Channel (PDCCH).

The terminal 200 may receive the RAR message transmitted by the base station 100. The terminal 200 transmits (205) msg3 to the base station 100 based on the RAR message. The terminal 200 may identify a MAC-PDU for PRACH, through which the terminal 200 transmits the random access preamble, using the RA-RNTI from the PDCCH. The terminal 200 may identify a RAR in response to the random access preamble transmitted by the terminal 200 using the Random Access Preamble Identifier (RAPID) included in the MAC-PDU. The terminal 200 may check the UL-Grant information and the temporary C-RNTI information included in the RAR. The terminal 200 transmits (205), to the base station 100, the msg3, which can be used for at least one of Radio Resource Control (RRC) connection establishment, handover, and failure link recovery, based on the UL-Grant information and the temporary C-RNTI information.

It may occur that a terminal other than the terminal 200 transmits the same random access preamble as that of the terminal 200 to the base station 100. Here, the base station 100 may transmit the same RAR message to the terminal 200 and the other terminal. In this case, the terminal 200 and the other terminal may identify the same UL-Grant information included in the same RAR message. Therefore, the terminal 200 and the other terminal may each transmit a msg3 message through the same uplink channel. That is, the msg3 of the terminal 200 and msg3 of the other terminal may collide in the same uplink channel.

The base station 100 transmits an acknowledgement (ACKnowledge) message to the terminal 200 that has transmitted the msg3. The base station 100 may transmit the acknowledgement message to the terminal 200 that has succeeded in connection through random access. The terminal 200 may identify the acknowledgment message as a temporary C-RNTI. After receiving the acknowledgement message, the terminal 200 may terminate the random access procedure. According to another embodiment of the present disclosure, a plurality of terminals may attempt the random access to the base station 100. When a plurality of terminals attempts the random access to the base station 100, some terminals may not receive the acknowledgment message from the base station 100. Some terminals not receiving the acknowledgment message from the base station 100 may reattempt the random access to the base station 100 in another time interval through a backoff procedure.

Figure 3:
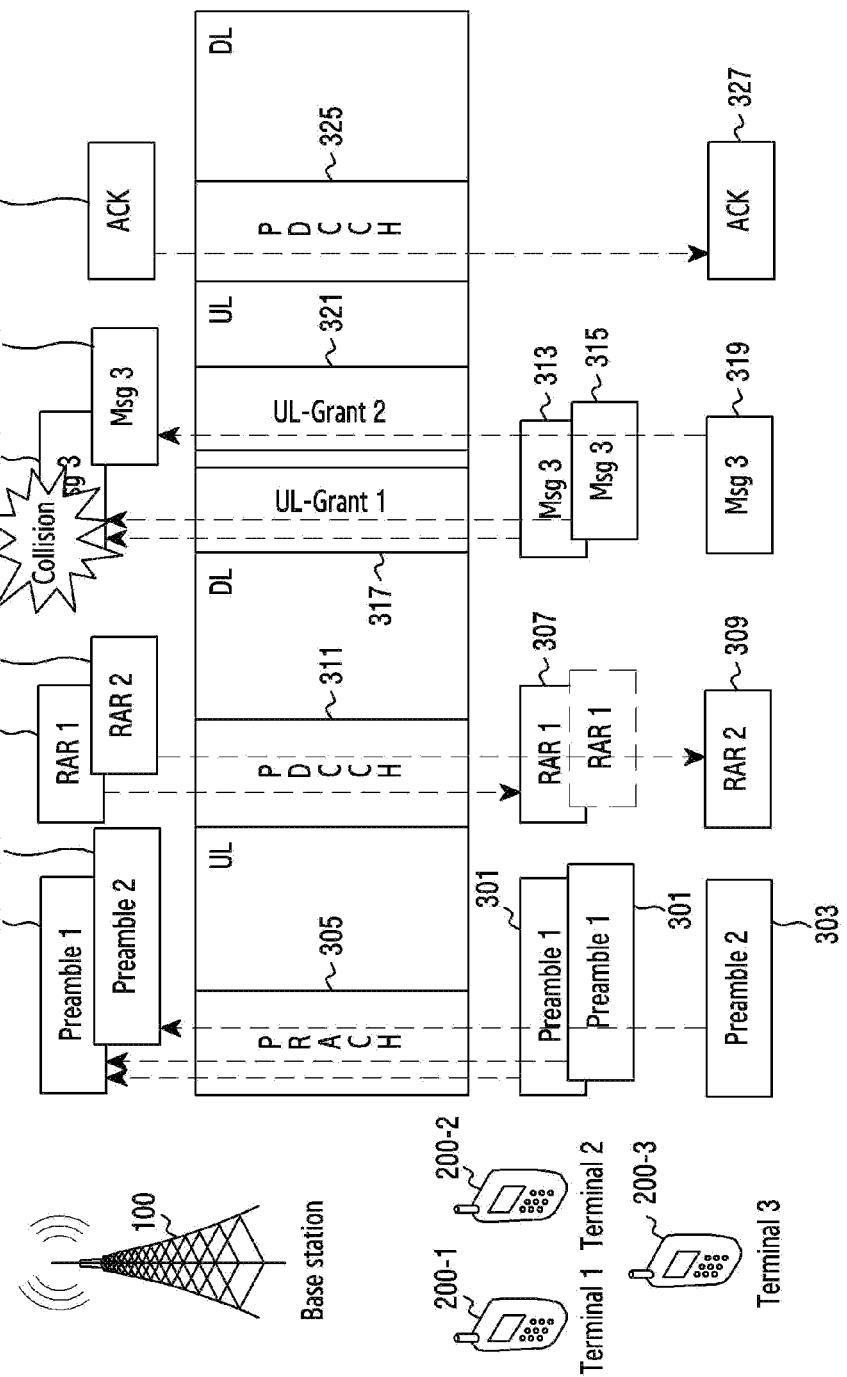
FIG. 3 illustrates a scenario in which msg3 messages collide in an uplink during a random access procedure.

For example, as illustrated in FIG. 3, the base station 100 and the terminal 200 may perform a random access procedure in 3GPP Rel-11. Referring to FIG. 3, a plurality of terminals 200-1 to 200-3 may each transmit random access preambles 301 and 303 to the base station 100 via an uplink PRACH 305. For example, a terminal 1 (200-1) may transmit a random access preamble 1 (301) to the base station 100. A terminal 2 (200-2) may transmit the same random access preamble 1 (301) as the random access preamble of the terminal 1 (200-1) to the base station 100. A terminal 3 (200-3) may transmit a random access preamble 2 (303) to the base station 100.

The base station 100 may transmit, to the plurality of terminals 200-1 to 200-3, RAR messages in response to the respective random access preambles received from the plurality of terminals 200-1 to 200-3. The terminal 1 (200-1) and the terminal 2 (200-2) may each transmit the same random access preamble 1 (301) to the base station 100. The base station 100 cannot recognize from which terminal the random access preamble 1 (301) transmitted by the terminal 1 (200-1) and the random access preamble 1 (301) transmitted by the terminal 2 (200-2) are transmitted. That is, the base station 100 can recognize only that the random access preamble 1 (301) has been received. Therefore, the base station 100 may transmit a RAR 1 (307) for the random access preamble 1 (301) and a RAR 2 (309) for the random access preamble 2 (303).

Each of the terminal 1 (200-1) and the terminal 2 (200-2) may recognize that the RAR 1 (307) transmitted by the base station 100 is a RAR transmitted thereto. The terminal 1 (200-1) and the terminal 2 (200-2) may respectively transmit msg3s (313 and 315) to the base station 100 through the same UL-Grant 1 (317) of an uplink. Therefore, the msg3s (313 and 315) transmitted through the UL-Grant 1 (317) may collide. This collision may frequently occur with an increase in the number of terminals transmitting a random access preamble to the base station 100 through a PRACH.

A congestion control technique for MTC random access suggested at a conference on the standardization of 3GPP Rel-11 limits the number of preambles used in a PRACH in order to support multiplexing with guaranteed orthogonality between a plurality of preambles in the same channel. In a MTC scenario considered in a 3GPP network, since the number of terminals participating in random access significantly increases, access performance may be reduced due to the occurrence of collisions in the random access procedure. Therefore, a method may be required which is capable of increasing a random access transmission opportunity without increasing the number of preambles in order to mitigate congestion in random access.

3GPP Rel-11 proposes an Access Class Barring (ACB) scheme, a PRACH access resource separation scheme, an additional PRACH allocation scheme, a separate backoff parameter application scheme, a multiple PRACH frame structure scheme, and an iterative PRACH and RAR transmission scheme in order to mitigate congestion caused by contention between terminals in a MTC random access procedure.

The ACB scheme refers to a technique of classifying terminals into classes according to service and stochastically limiting the opportunity for access to a PRACH according to class. Using the ACB scheme may reduce the number of terminals simultaneously accessing a PRACH, thereby mitigating congestion in random access. However, since the ACB scheme limits the opportunity for access to the PRACH, the terminals may have limited opportunities for access and system access time may be delayed. Also, since the ACB scheme does not actually increase the opportunity for access to the PRACH, congestion in random access may occur with an increase in the number of terminals.

The PRACH access resource separation scheme refers to a technique of separating PRACH access resources used for a mobile communication terminal from those for a MTC terminal. For example, the mobile communication terminal and the MTC terminal may perform random access by accessing different PRACHs or using different preambles. The PRACH access resource separation scheme uses a PRACH section and preambles, which are limited PRACH resources, in a divided manner and thus may cause a decrease in random access performance.

The separate backoff parameter application scheme refers to a technique in which MTC terminals, which have failed in random access, perform a backoff mechanism by applying a separate parameter that is not used by mobile communication terminals. The separate backoff parameter application scheme sets a backoff interval for the MTC terminals to be longer than that for the mobile communication terminals, thereby allowing the mobile communication terminals to attempt random access first. Therefore, the separate backoff parameter application scheme allows the mobile communication terminals to preferentially attempt random access and thus may cause deterioration in the random access performance of the MTC terminals.

The multiple PRACH frame structure scheme refers to a technique of multiplexing a plurality of PRACHs using Time Division Multiple Access (TDM)/Frequency Division Multiple Access (FDM)/Code Division Multiple Access (CDM) to extend the PRACH coverage of a MTC terminal.

Figure 4:
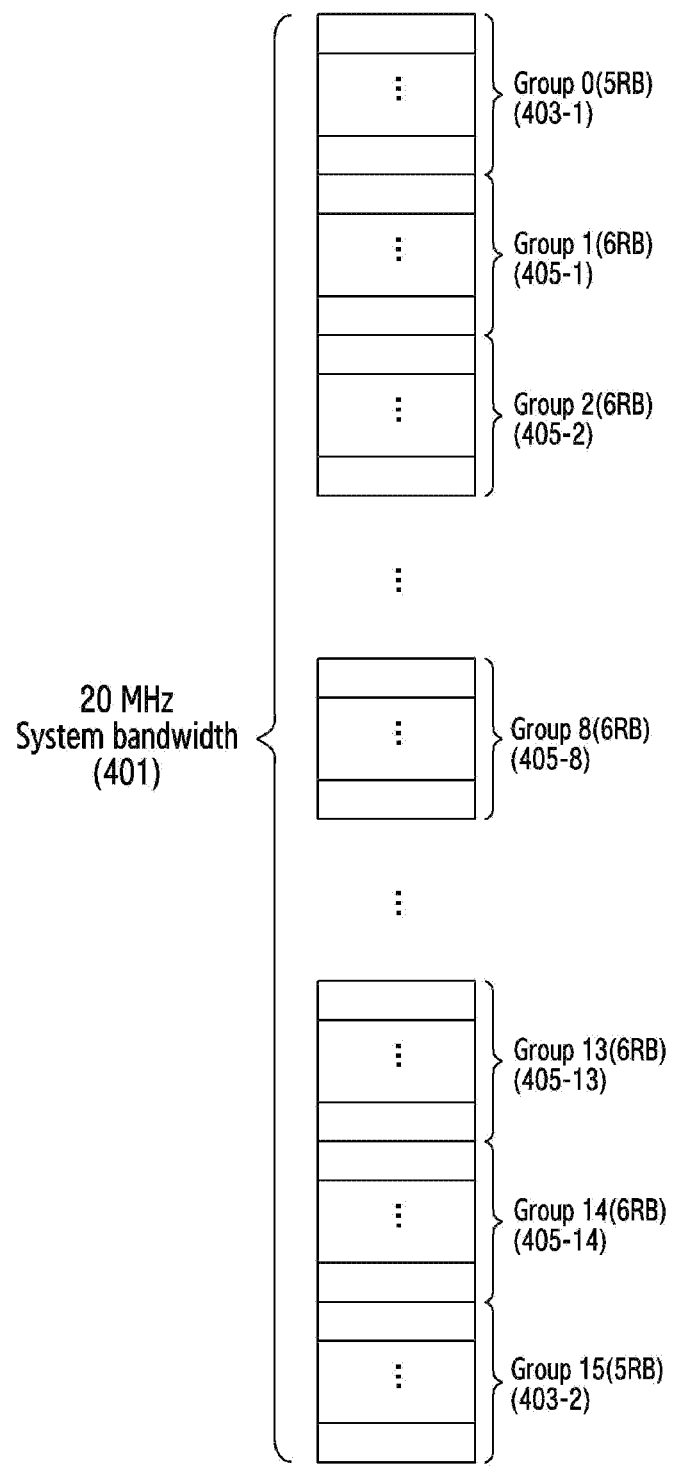
FIG. 4 illustrates a multi-channel structure based on Frequency Division Multiple Access (FDMA)

For example, as illustrated in FIG. 4, a multi-channel structure based on Frequency Division Multiple Access (FDM) may be considered. FIG. 4 illustrates a grouping Preamble Resource Block (PRB) structure in which the entire system band 401 is divided into a plurality of fixed narrowband channels on the assumption that a MTC terminal uses only a 1.4-MHz narrowband of the entire frequency band. The entire system band 401 may be divided into group 1 to group 14 (405-1 to 405-14), which are groups of 14 6RB radio resources each using 1.4 MHz, and group 0 and group 15 (403-1 and 403-2), which include two incomplete 5RB radio resources. Primary Synchronization Channel/Secondary Synchronization Channel (PSS/SSS) and a Physical Broadcast Channel (PBCH) may be located in the central PRB group of the entire system band 401. The multi-channel structure based on FDM may be a fixed narrowband multi-channel structure established by dividing radio resources in a fixed manner. Therefore, the multi-channel structure based on FDM may be inefficient in an environment where a plurality of MTC terminals is distributed.

Figure 5:
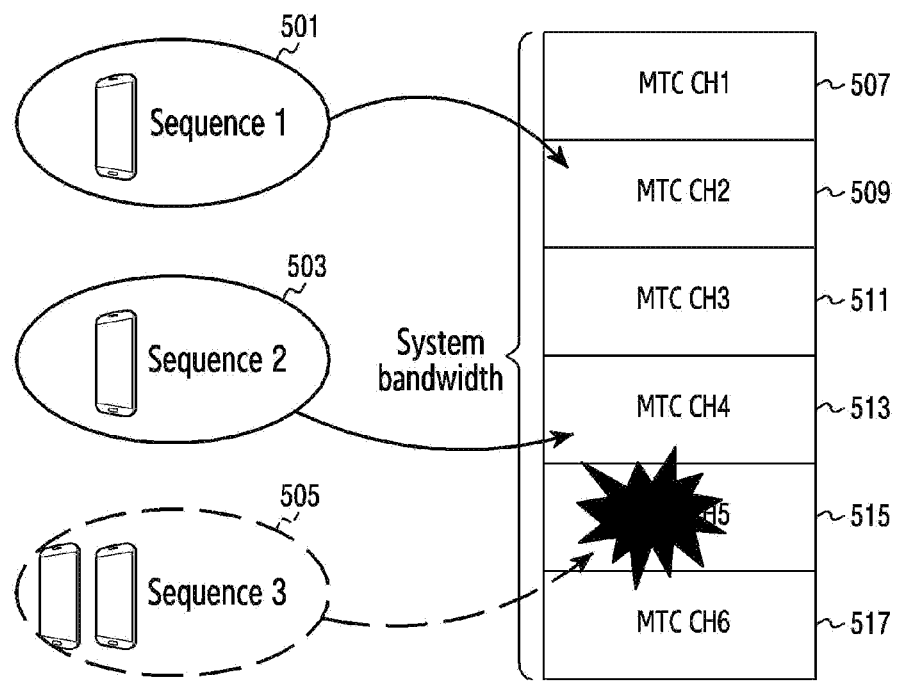
FIG. 5 illustrates mapping between a PRACH sequence and a narrowband channel.

The iterative PRACH and RAR transmission scheme refers to a technique of repeatedly transmitting a preamble through a PRACH and a RAR message in response to the preamble in order to improve the reception probability of MTC terminals through the extension of random access coverage of the MTC terminals. For example, as illustrated in FIG. 5, mapping may be established between a PRACH sequence and a narrowband channel. Referring to FIG. 5, a base station may extend random access coverage to improve the reception probability of a plurality of MTC terminals. For example, the base station may repeatedly receive a random access preamble from each of the plurality of MTC terminals via a PRACH. Also, the base station may repeatedly transmit a RAR message in response to each random access preamble. The plurality of MTC terminals needs to know the repetition level at which the base station transmits the RAR message in order to receive the RAR message transmitted from the base station. To this end, the iterative PRACH and RAR transmission schemes may determine the selection frequency of a PRACH randomly selected by each of a plurality of terminals, the position of a frequency band in which a RAR is transmitted in response to a sequence through a PRACH randomly selected by each of the plurality of terminals, and the frequency of transmission of the RAR. In the iterative PRACH and RAR transmission scheme, the plurality of terminals and the base station may determine the position of a narrowband channel that can be used depending on the PRACH sequence.

For example, a sequence 1 (501) may be mapped to a MTC CH 2 (509), a sequence 2 (503) may be mapped to a MTC CH 4 (513), and a sequence 3 (505) may be mapped to a MTC CH 5 (515). Here, a plurality of terminals using the sequence 3 (505) may collide in the MTC CH 5 (515). Since only some of all PRACH sequences can be mapped, the foregoing mapping may limit the random access opportunity of the plurality of terminals. In addition, since the foregoing mapping does not increase the random access opportunity of the plurality of terminals, congestion in random access may increase with an increase in the number of terminals participating in the random access.

As described above, congestion in random access may be mitigated by dispersing random access attempts by a mobile communication terminal and a MTC terminal. The foregoing schemes reduce the number of terminals accessing a PRACH, thereby decreasing the probability that a plurality of terminals selects the same preamble. However, the foregoing schemes cannot actually increase a random access opportunity that can be provided for a terminal. A scheme of allocating additional PRACH resources may involve redesigning physical channel and frame structures defined in the 3GPP standard. As a result, if the number of terminals continuously increases, the number of terminals per PRACH increases and thus the probability of random access failure may increase. That is, a method for increasing a random access opportunity is needed in order to accommodate a plurality of terminals in the 3GPP mobile communication system.

Figure 6:
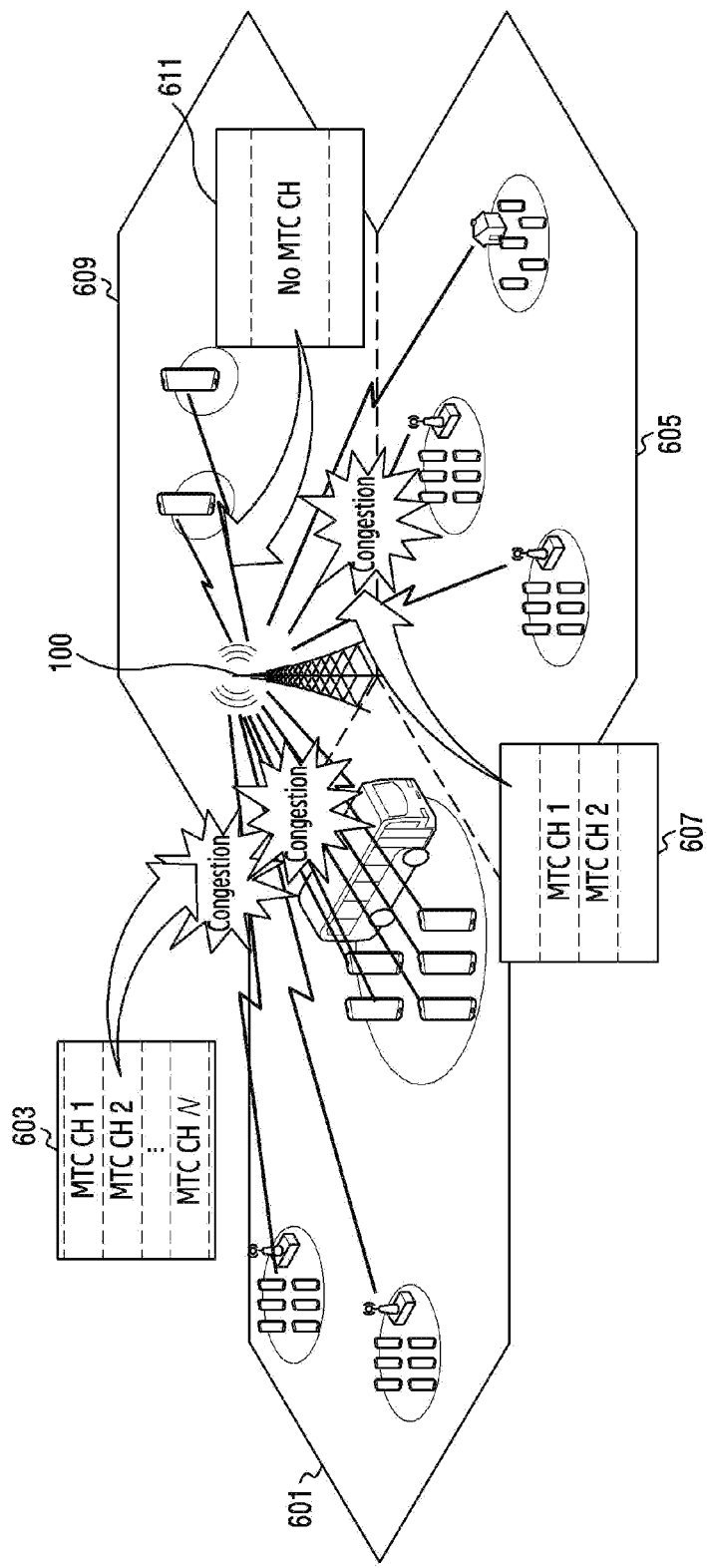
FIG. 6 illustrates a channel management method for a MTC terminal in a cell or a sector of a base station in a wireless communication system according to an embodiment of the present disclosure.

FIG. 6 illustrates a channel management method for a MTC terminal in a cell or a sector of a base station in a wireless communication system according to an embodiment of the present disclosure.

Referring to FIG. 6, a base station 100 may manage independent MTC channels (603, 607, 611) in respective sectors (601, 605, 609) based on the random access of at least one MTC terminal in the coverage of the base station 100. The base station 100 may allocate the MTC channels (603, 607, 611) within radio resources available for the base station 100 based on the duplex mode of the base station 100. That is, the base station 100 may manage different numbers of MTC channels for the respective sectors based on access requests from MTC terminals received in the respective sectors (601, 605, 609). For example, the base station 100 may manage N MTC channels (603) in a sector 601 based on access requests from MTC terminals in the sector 601. Further, the base station 100 may manage two MTC channels (607) in a sector 605. When there is no access request from MTC terminals in the sector 609, the base station 100 may not manage any MTC channel in the sector 609.

A channel for the base station 100 to transmit data to the at least one MTC terminal may be referred to as a downlink MTC channel. Further, a channel for the at least one MTC terminal to transmit data to the base station 100 may be referred to as an uplink MTC channel. According to the embodiment of the present disclosure, the at least one terminal may receive a RAR response message from the base station 100 through a channel different from a channel used to transmit a random access preamble to the base station 100. Here, the reception of the RAR response message by the at least one terminal through the channel different from the channel used to transmit the random access preamble may be referred to as a channel change.

Figure 7:
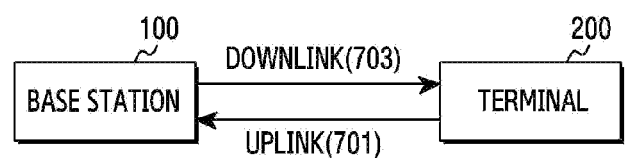
FIG. 7 illustrates an environment for communication between a base station and a terminal according to an embodiment of the present disclosure.

FIG. 7 illustrates an environment for communication between a base station 100 and a terminal 200 according to an embodiment of the present disclosure.

Referring to FIG. 7, the base station 100 may communicate with the terminal 200 through an uplink 701 and a downlink 703. For example, the base station 100 may transmit data to the terminal 200 through the downlink 703. The base station 100 may receive data from the terminal 200 through the uplink 701.

The terminal 200 includes a communication tool for performing communication with the base station 100. The terminal 200 is an electronic device that the user can carry. For example, the terminal 200 may be one of a smartphone, a portable terminal, a mobile phone, a mobile pad, a media player, a tablet computer, a handheld computer, a Personal Digital Assistant (PDA), a wireless controller, and a wearable device, and may also be a device having functions of two or more of the aforementioned devices.

For example, the terminal 200 may be one of a smart TV, a monitor, a speaker, a woofer, a black box, a wristwatch-type terminal, a glasses-type terminal, an electronic device with a communication function that is attachable to clothing, a camera, a beam projector, a Closed Circuit Television (CCTV), a printer, a fax, a three-dimensional (3D) printer, a smartphone, a portable terminal, a mobile phone, a mobile pad, a media player, a tablet computer, a handheld computer, and a PDA, or may be a device having functions of two or more of the aforementioned devices.

Figure 8:
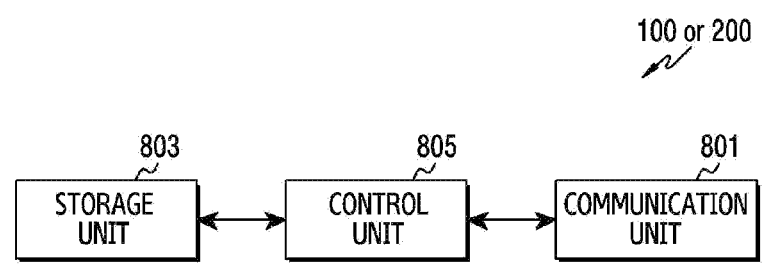
FIG. 8 is a block diagram illustrating the configuration of a base station or a terminal according to an embodiment of the present disclosure.

FIG. 8 is a block diagram illustrating the configuration of a base station 100 or a terminal 200 according to an embodiment of the present disclosure.

Referring to FIG. 8, the base station 100 or the terminal 200 includes a communication unit 801, a storage unit 803, and a control unit 805. The communication unit 801 serves to perform transmission/reception processing of a radio signal of data input/output through an antenna (not shown). For example, in transmission, the communication unit 801 serves to perform channel coding and diffusion of data to transmit, to perform RF processing of the data, and to transmit the data. In reception, the communication unit 801 serves to convert a received RF signal into a baseband signal and to reconstruct the baseband signal into data via backward diffusion and channel decoding. According to the embodiment of the present disclosure, when the communication unit 801 is a component of the base station 100, in addition to general functions, the communication unit 801 may receive at least one random access preamble from at least one terminal. The communication unit 801 may broadcast system information including at least one of the number of allocated channels and a channel identifier for machine-to-machine communication before receiving the at least one random access preamble. The communication unit 801 may transmit, through at least one downlink channel, at least one message generated by multiplexing a plurality of random access responses corresponding to each of the at least one random access preamble.

The storage unit 803 stores a microcode of a program and various reference data for processing and controlling the control unit 805.

The control unit 805 controls the overall operation of the base station 100 or the terminal 200. For example, the control unit 805 performs processing and control for data communication. According to the embodiment of the present disclosure, when the control unit 805 is a component of the base station 100, in addition to general functions, the control unit 805 may multiplex a plurality of random access responses corresponding to each of the at least one random access preamble to generate at least one message. The control unit 805 may determine the number of a plurality of random access responses corresponding to each of the at least one random access preamble. The control unit 805 may generate the at least one message including a plurality of different pieces of uplink data allocation information corresponding to each of the at least one random access preamble. The control unit 805 may generate one frame including the at least one message. The control unit 805 may generate a plurality of different frames including the at least one message. The control unit 805 may determine a correlation value for each of the at least one random access preamble and may generate the at least one message including at least one piece of uplink data allocation information corresponding to each of the at least one random access preamble based on the correlation value. The control unit 805 may determine a received signal strength for each of the at least one random access preamble. The control unit 805 may generate the at least one message including at least one piece of uplink data allocation information corresponding to each of the at least one random access preamble based on the received signal strength. The control unit 805 may generate the at least one message based on at least one of the amount of traffic transmitted or received by the base station, the amount of resources used by the base station, and the service quality of the base station.

According to another embodiment of the present disclosure, when the communication unit 801 is a component of the terminal 200, the communication unit 801 may transmit a random access preamble selected from among a plurality of random access preambles to the base station 100. The communication unit 801 may receive at least one message including a plurality of multiplexed random access responses corresponding to the selected random access preamble from the base station 100. The communication unit 801 may transmit a msg3 message to the base station 100 through a channel resource corresponding to one random access response selected from among the plurality of multiplexed random access responses. The communication unit 801 may receive the at least one message from the base station 100 through a downlink channel of a channel different from a channel used to transmit the selected random access preamble to the base station 100.

According to another embodiment of the present disclosure, when the control unit 805 is a component of the terminal 200, the control unit 805 may select one random access response from among the plurality of multiplexed random access responses. The control unit 805 may detect the at least one message included in one frame. The control unit 805 may detect the at least one message included in each of a plurality of frames.

Figure 9:
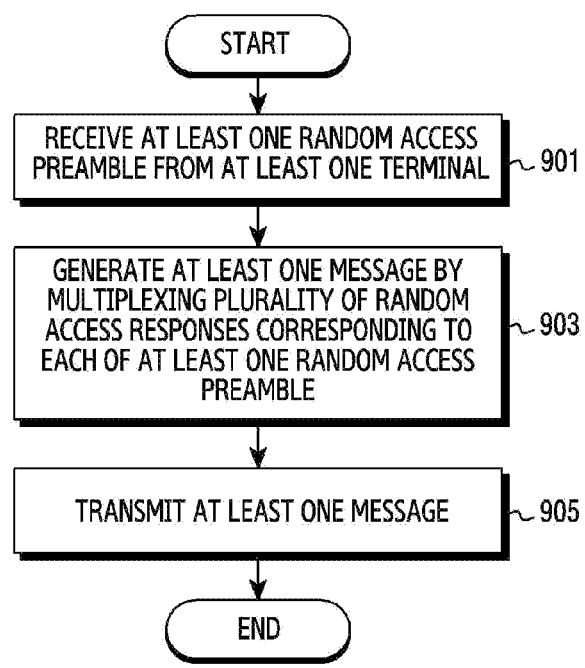
FIG. 9 is a flowchart illustrating the operation of a base station according to an embodiment of the present disclosure.

FIG. 9 is a flowchart illustrating the operation of a base station according to an embodiment of the present disclosure.

Referring to FIG. 9, the base station 100 receives at least one random access preamble from at least one terminal in operation 901. The base station 100 may broadcast system information including at least one of the number of allocated channels and a channel identifier for machine-to-machine communication before receiving the at least one random access preamble.

In operation 903, the base station 100 generates at least one message by multiplexing a plurality of random access responses corresponding to each of the at least one random access preamble. The base station 100 may determine the number of a plurality of random access responses corresponding to each of the at least one random access preamble.

The base station 100 may generate the at least one message including a plurality of different pieces of uplink data allocation information corresponding to each of the at least one random access preamble.

The base station 100 may include the at least one message in one frame. The base station 100 may include the at least one message in a plurality of different frames.

The base station 100 may determine a correlation value for each of the at least one random access preamble. The base station 100 may generate the at least one message including at least one piece of uplink data allocation information corresponding to each of the at least one random access preamble based on the correlation value.

The base station 100 may determine a received signal strength for each of the at least one random access preamble. The base station 100 may generate the at least one message including at least one uplink data allocation information corresponding to each of the at least one random access preamble based on the received signal strength.

The base station 100 may generate the at least one message based on at least one of the amount of traffic transmitted or received by the base station, the amount of resources used by the base station, and the service quality of the base station.

In operation 905, the base station 100 transmits the at least one message. The base station 100 may transmit the at least one message through at least one downlink channel.

Figure 10:
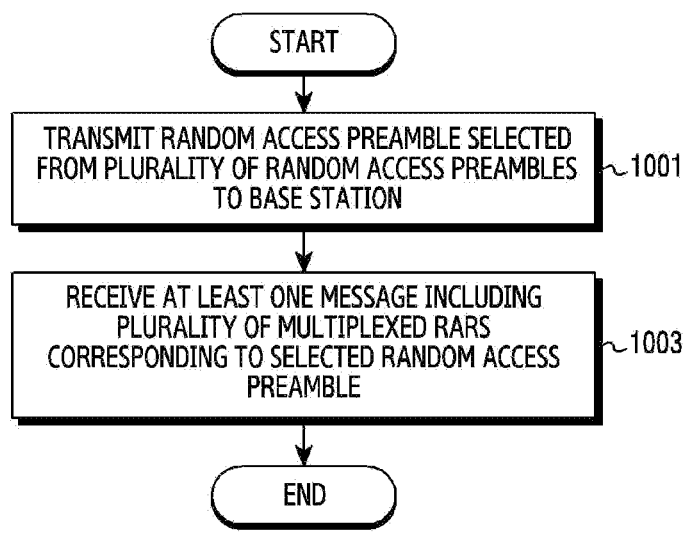
FIG. 10 is a flowchart illustrating the operation of a terminal according to an embodiment of the present disclosure.

FIG. 10 is a flowchart illustrating the operation of a terminal according to an embodiment of the present disclosure.

Referring to FIG. 10, the terminal 200 transmits a random access preamble selected from among a plurality of random access preambles to a base station in operation 1001.

In operation 1003, the terminal 200 receives at least one message including a plurality of multiplexed random access responses corresponding to the selected random access preamble from the base station 100. The terminal 200 may select one random access response from among the plurality of multiplexed random access responses. The terminal 200 may detect the at least one message included in one frame. The terminal 200 may detect the at least one message included in each of a plurality of frames. The terminal 200 may receive the at least one message through a downlink channel of a channel different from a channel used to transmit the selected random access preamble. The terminal 200 may transmit a msg3 message through a channel resource corresponding to the selected random access response.

Figure 11:
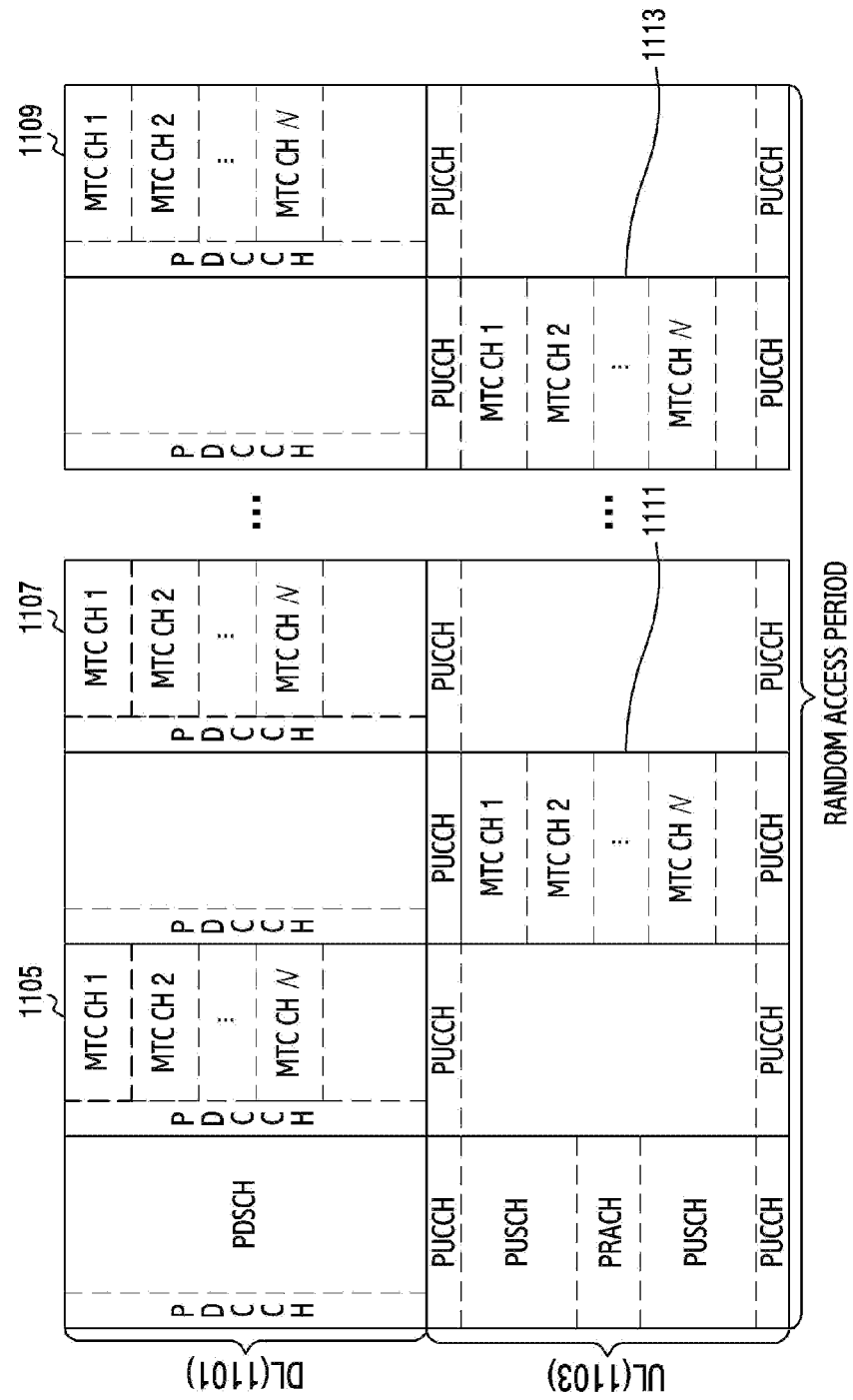
FIG. 11 illustrates a frame including a FDD-based MTC channel used in a wireless communication system according to an embodiment of the present disclosure.

FIG. 11 illustrates a frame including a FDD-based low-power MTC channel used in a wireless communication system according to an embodiment of the present disclosure.

Referring to FIG. 11, a frequency-divided frame may include a plurality of 1.4-MHz narrowband MTC channels (1105 to 1113) in data channels of an uplink 1103 and a downlink 1101. A base station 100 may determine a network performance indicator including at least one of traffic volume, a resource utilization rate, and the Quality of Service (QoS) of a MTC service based on a signal received from at least one terminal. The base station 100 may determine the number of the 1.4-MHz MTC channels to be allocated in the data channels available by the base station 100 based on the network performance indicator. The MTC channels may include a low-cost MTC-dedicated control channel and a data channel. The base station 100 may transmit a SIB including information on the number and the positions of the MTC channels through a broadcast channel to all terminals located within the coverage of the base station 100. According to the embodiment of the present disclosure, a PRACH may be located in all 1.4-MHz MTC channels or in some of specific MTC channels. For example, one PRACH may exist in the uplink 1103. Also, the PRACH may be included in each of a plurality of MTC channels 1 to N in the uplink 1103. Specifically, a PRACH 1 may be located in a MTC CH 1, and a PRACH 2 may be located in a MTC CH 2.

MTC channels corresponding to the plurality of MTC channels 1 to N, each including the PRACH, in the uplink 1103 may be located in the downlink. For example, downlink MTC channels (1105 or 1107 or 1109) corresponding to the plurality of MTC channels may be located in the downlink 1101.

Figure 12:
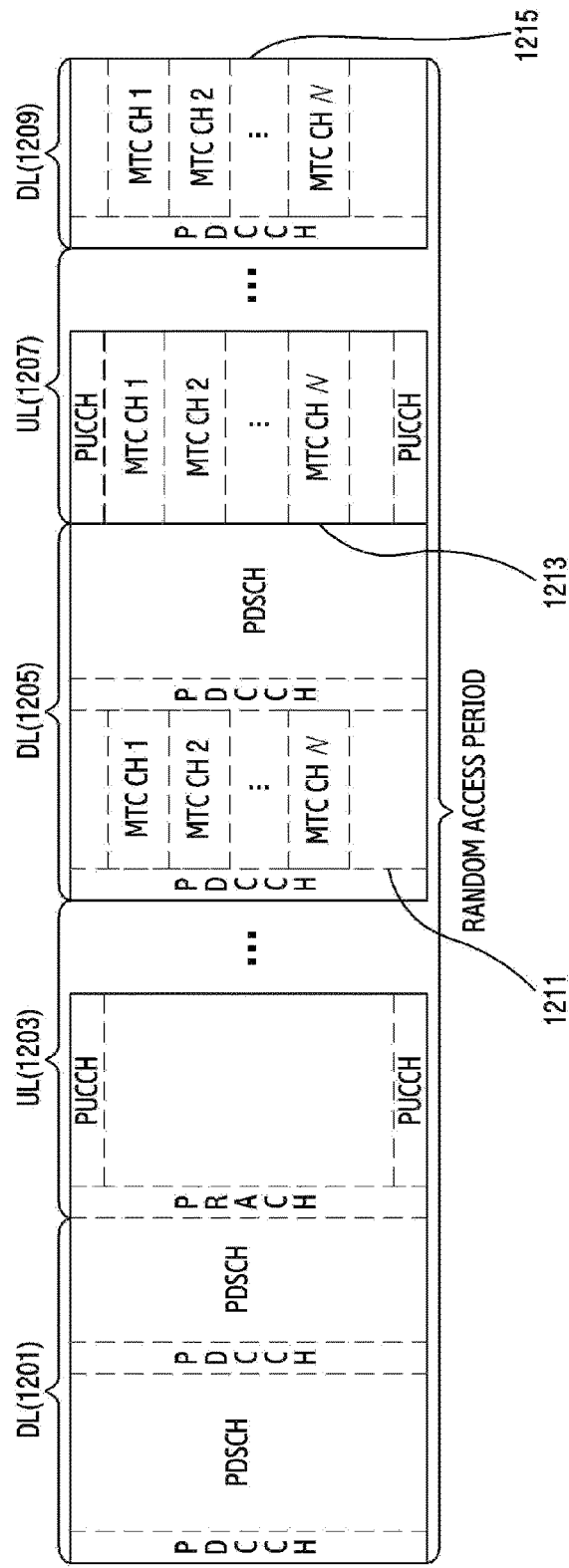
FIG. 12 illustrates a frame including a TDD-based MTC channel in a wireless communication system according to an embodiment of the present disclosure.

FIG. 12 illustrates a frame including a TDD-based low-power MTC channel in a wireless communication system according to an embodiment of the present disclosure.

Referring to FIG. 12, according to another embodiment of the present disclosure, a time-divided frame may include a plurality of 1.4-MHz narrowband MTC channels (1211 to 1215) in data channels of an uplink and a downlink. For example, each of downlink sections (1201, 1205, 1209) may be divided according to time. Also, each of uplink sections (1203, 1207) may be divided according to time. Here, an uplink may include one PRACH. For example, an uplink 1203 may include one PRACH. The uplink may also include a plurality of PRACHs. For example, each of a plurality of MTC CHs 1 to N (1213) in an uplink 1207 may include one PRACH. For example, the MTC CH 1 may include a PRACH 1. Further, the MTC CH N may include a PRACH N.

A plurality of MTC channels corresponding to the plurality of MTC channels CH 1 to CH N in the uplink may be included in a downlink. For example, a downlink 1205 may include a plurality of MTC channels CH 1 to CH N (1211). In addition, a downlink 1209 may include a plurality of MTC channels CH 1 to CH N (1215).

Figure 13:
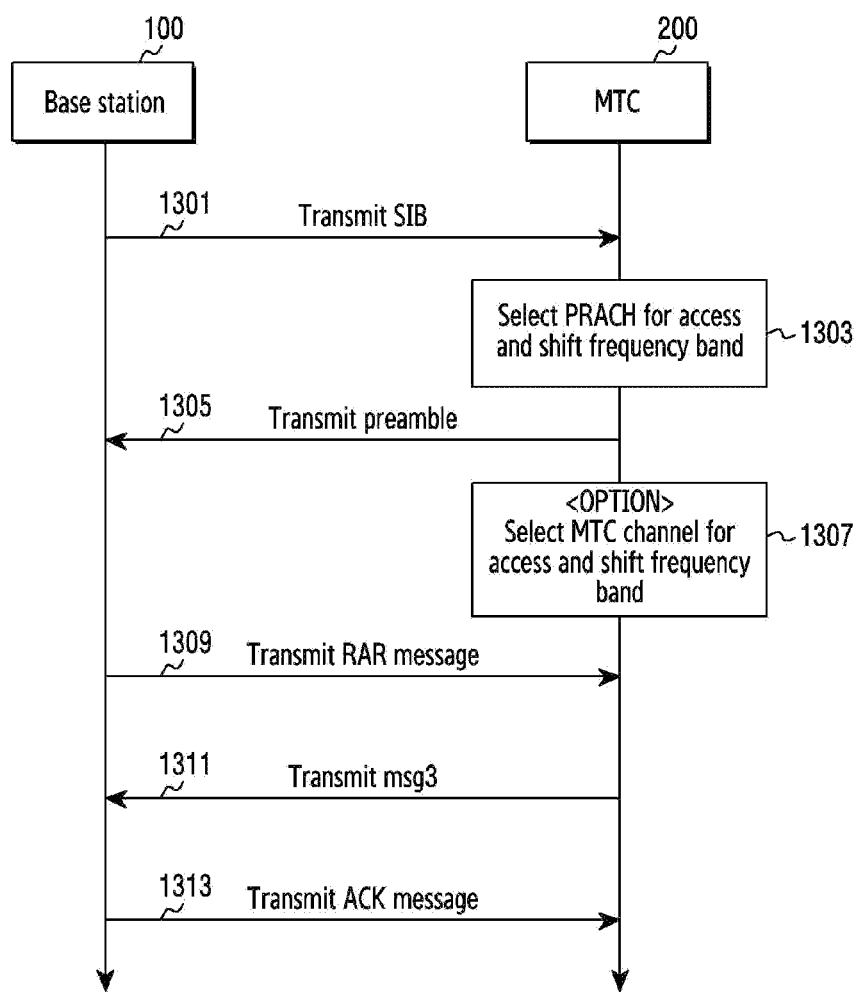
FIG. 13 illustrates signal flow between a base station and a terminal in a wireless communication system according to an embodiment of the present disclosure.

FIG. 13 illustrates signal flow between a base station and a terminal in a wireless communication system according to an embodiment of the present disclosure.

Referring to FIG. 13, the base station 100 transmits (1301) a SIB to a MTC terminal 200 in order to induce random access of a MTC terminal 200. The SIB may include information on the multiplexing structure of a MTC channel. The base station 100 may periodically transmit the SIB to the MTC terminal 200 through a broadcast channel. The information on the multiplexing structure of the MTC channel may include the number of MTC channels and a MTC channel index. For example, the MTC terminal 200 may check at least one MTC channel available for the MTC terminal 200 among a plurality of MTC channels based on the information on the multiplexing structure of the MTC channel.

The MTC terminal 200 may select a PRACH for transmitting a random access preamble to the base station 100 based on the SIB. As illustrated in FIG. 11, the PRACH may be one of a plurality of uplink MTC channels. Alternatively, the PRACH may be one of PRACHs used by a mobile communication terminal.

The MTC terminal 200 may shift (1303) to an uplink frequency band corresponding to the selected PRACH. The MTC terminal 200 transmits (1305) the random access preamble to the base station 100 through the selected PRACH. Next, the MTC terminal 200 may select (1307) at least one downlink MTC channel corresponding to the transmitted random access preamble. According to another embodiment of the present disclosure, the MTC terminal 200 may select a downlink MTC channel corresponding to the transmitted random access preamble and may then shift to a downlink frequency band corresponding to the downlink MTC channel. This operation may be required when a channel change is performed between operation 1303 and operation 1307.

The base station 100 transmits (1309) a multiplexed RAR message to the MTC terminal 200 through the at least one downlink MTC channel corresponding to the selected PRACH. For example, as illustrated below in FIGS. 15B to 15C, the base station 100 may transmit a MAC frame including a plurality of RARs in response to one random access preamble.

The MTC terminal 200 may receive a MAC frame including a plurality of RARs corresponding to the random access preamble from the base station 100 via the at least one downlink MTC channel. The MTC terminal 200 may determine a MTC channel for data transmission by selecting any one of the plurality of RARs corresponding to the random access preamble. The MTC terminal 200 may transmit (1311) a msg3 to the base station 100 through the MTC channel for data transmission. After receiving the msg3, the base station 100 transmits (1313) an acknowledgement (ACKnowledge) message to the MTC terminal 200 that has transmitted the msg3.

Figure 14:
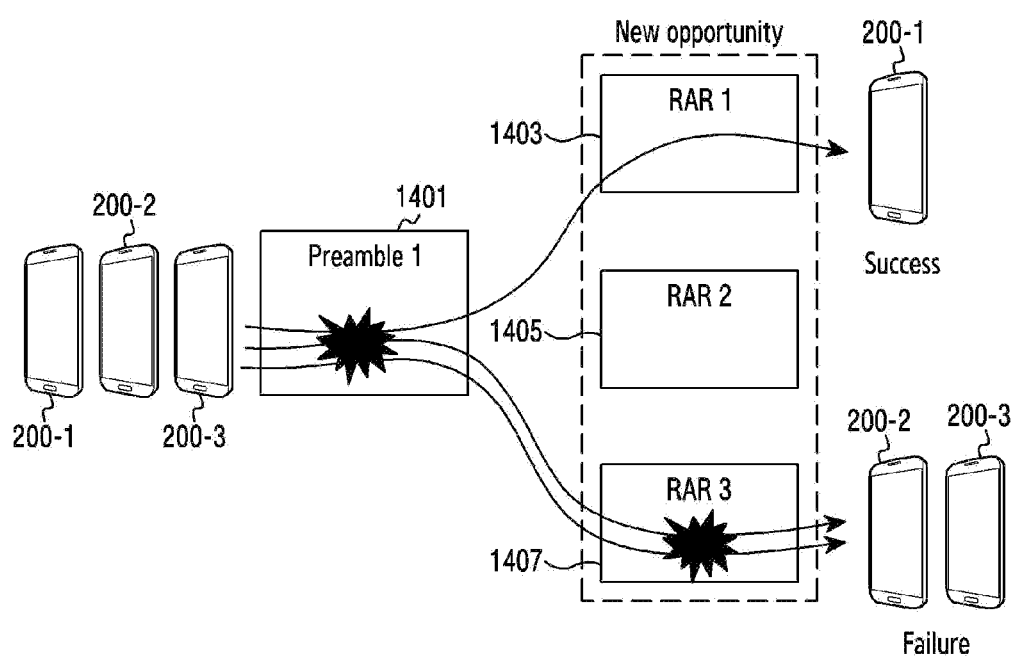
FIG. 14 illustrates terminals that attempt random access to a base station based on a plurality of RAR messages in a wireless communication system according to an embodiment of the present disclosure.

FIG. 14 illustrates terminals that attempt random access to a base station based on a plurality of RAR messages in a wireless communication system according to an embodiment of the present disclosure.

Referring to FIG. 14, a plurality of MTC terminals 200-1 to 200-3 may transmit the same random access preamble 1 (1401) to the base station 100. The base station 100 may allocate a plurality of RAR messages for the random access preamble 1 (1401). For example, the base station 100 may allocate RARs 1 to 3 (1403 to 1407) for the random access preamble 1 (1401). That is, the plurality of MTC terminals 200-1 to 200-3 may receive the plurality of RAR messages from the base station 100. For example, the plurality of MTC terminals 200-1 to 200-3 may receive the RARs 1 to 3 (1403 to 1407) from the base station 100. The RAR 1 (1403) may include a UL-Grant 1, the RAR 2 1405 may include a UL-Grant 2, and the RAR 3 (1407) may include a UL-Grant 3.

Here, each of the plurality of MTC terminals 200-1 to 200-3 may select one channel of a plurality of uplink channels based on the plurality of RAR messages and may access the base station 100.

The MTC terminals 200-1 to 200-3 may select one UL-Grant of a plurality of UL-Grants by receiving the plurality of RAR messages (1403 to 1407). For example, the MTC terminal 200-1 may select the RAR 1 (1403), and the MTC terminal 200-2 may select the RAR 3 (1407). In addition, the MTC terminal 200-3 may also select the RAR 3 (1407).

Therefore, the MTC terminals 200-1 to 200-3 may have a variety of paths for transmitting a msg3 to the base station 100. The MTC terminal 200-1 may successfully transmit a msg3 to the base station 100 by selecting the RAR 1. However, when the MTC terminal 200-2 and the MTC terminal 200-3 select the RAR 3, a collision may occur in an uplink channel by the UL-Grant of the RAR 3 between a msg3 transmitted from the MTC terminal 200-2 and a msg3 transmitted from the MTC terminal 200-3.

Figure 15A:
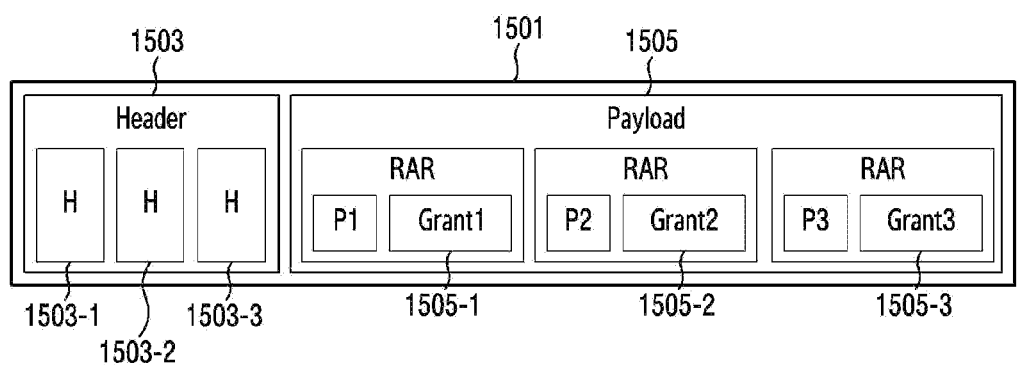
FIGS. 15A to 15C illustrate a MAC frame structure of a wireless communication system according to an embodiment of the present disclosure.
Figure 15B:
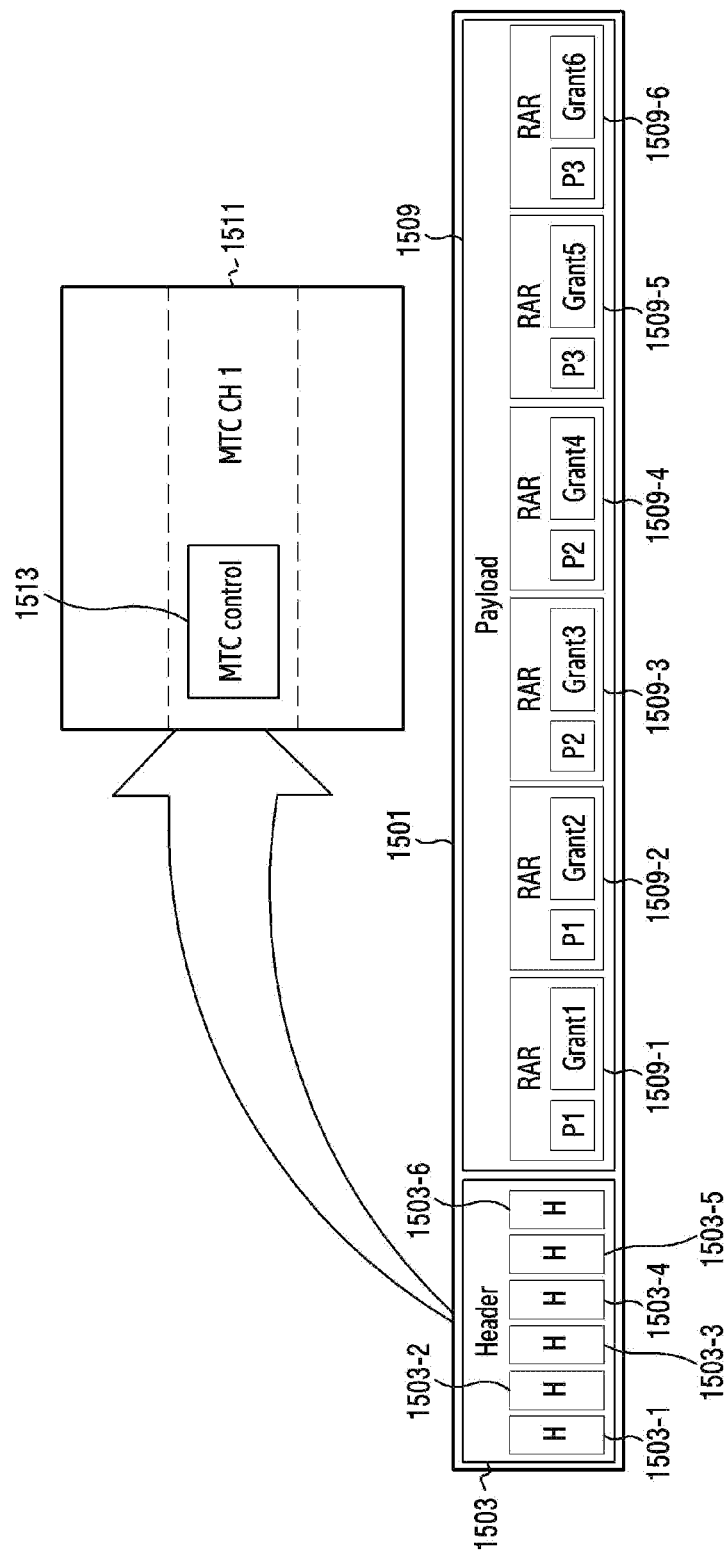
Figure 15C:
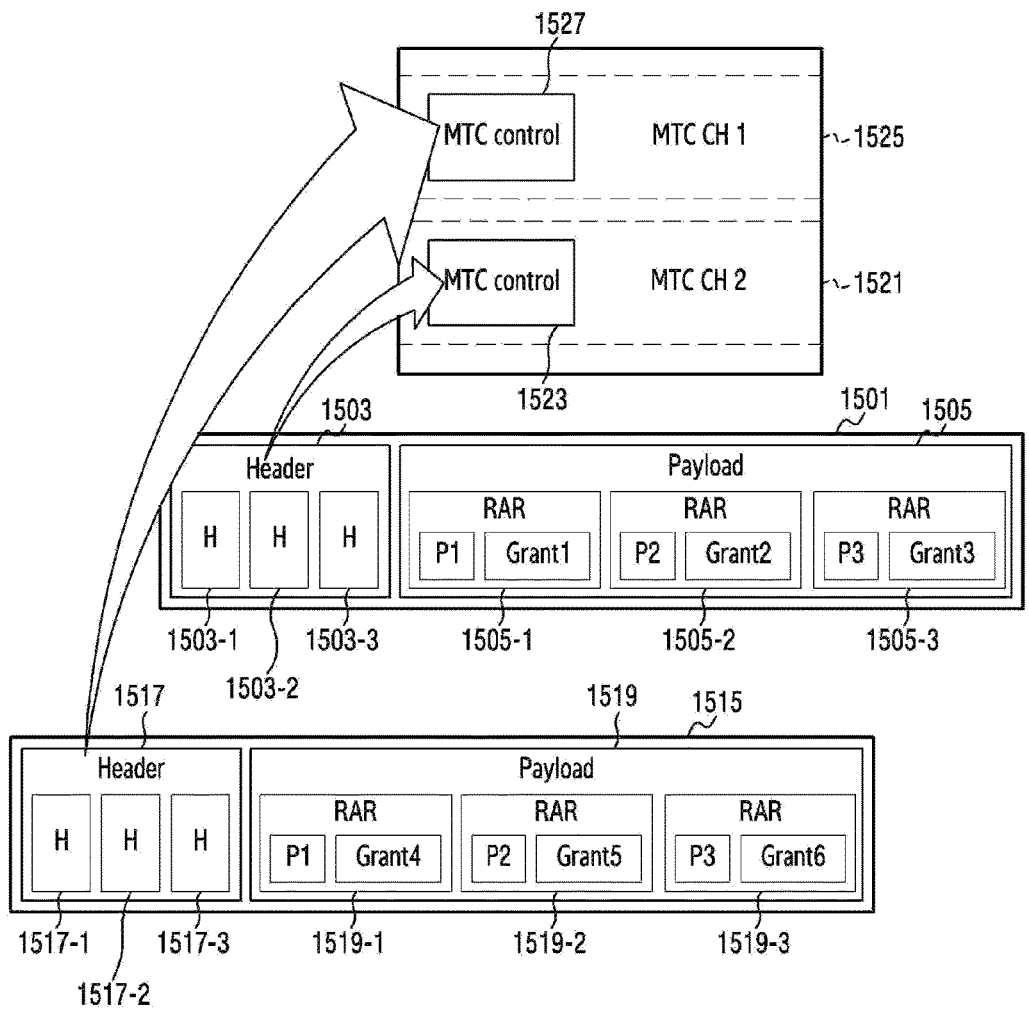

FIGS. 15A to 15C illustrate a MAC frame structure of a wireless communication system according to an embodiment of the present disclosure.

Referring to FIG. 15A, a base station 100 may generate a RAR message including one grant corresponding to one preamble. For example, the base station 100 may generate a MAC frame 1501 that includes a RAR message 1505-1 including a UL-Grant 1 allocated for a preamble 1, a RAR message 1505-2 including a UL-Grant 2 allocated for a preamble 2, and a RAR message 1505-3 including a UL-Grant 3 allocated for a preamble 3. The base station 100 may transmit the MAC frame 1501 to at least one terminal.

The at least one terminal may decode the RAR messages 1505-1 to 1505-3 based on pieces of RAR information (1503-1 to 1503-3) included in a header 1503 of the MAC frame 1501. For example, RAR information 1503-1 may include information on the RAR message 1505-1. RAR information 1503-2 may include information on the RAR message 1505-2. RAR information 1503-3 may include information on the RAR message 1505-3.

FIG. 15B illustrates a single MAC frame 1501 including a plurality of RAR messages in a wireless communication system according to an embodiment of the present disclosure. The base station 100 may multiplex, into one MAC frame 1501, RAR messages respectively relative to a plurality of random access preambles received via a specific PRACH from a plurality of terminals. That is, the base station may include a plurality of RAR messages corresponding to one random access preamble in one MAC frame 1501.

For example, the base station 100 may generate a RAR message 1509-1 including a UL-Grant 1 allocated for a random access preamble 1 and a RAR message 1509-2 including a UL-Grant 2 allocated for the random access preamble 1. The base station 100 may generate a RAR message 1509-3 including a UL-Grant 3 allocated for a random access preamble 2 and a RAR message 1509-4 including a UL-Grant 4 allocated for the random access preamble 2. The base station 100 may generate a RAR message 1509-5 including a UL-Grant 5 allocated for a random access preamble 3 and a RAR message 1509-6 including a UL-Grant 6 allocated for the random access preamble 3. That is, the base station 100 may allocate a plurality of different UL-Grants for one random access preamble. The base station 100 may generate a payload 1509 that includes the plurality of RAR messages 1509-1 to 1509-6 including the different UL-Grants allocated for the one random access preamble. The base station 100 may include pieces of information 1503-1 to 1503-6 on the plurality of RAR messages 1509-1 to 1509-6 in a header 1503 of the MAC frame 1501.

The base station 100 may receive the random access preambles respectively from the plurality of terminals through a radio resource of an uplink data channel available for the base station 100 in the wireless communication system according to the embodiment of the present disclosure. The base station 100 may transmit the plurality of RAR messages including different pieces of UL-Grant information in response to the respective random access preambles.

One of the plurality of terminals may use one RAR message among the plurality of RAR messages received from the base station 100. The one terminal may avoid a random access collision with another terminal that transmits the same random access preamble as that of the one terminal to the base station by using the one RAR message among the plurality of RAR messages. That is, the wireless communication system according to the embodiment of the present disclosure may provide a plurality of random access opportunities to each of the plurality of terminals.

Each of the plurality of terminals may receive the one MAC frame 1501 including the plurality of RAR messages from the base station 100. The terminal may obtain the pieces of information 1503-1 to 1503-6 on the plurality of RAR messages through the header 1503 of the MAC frame 1501. For example, the header 1503 of the MAC frame 1501 may include information on how many RAR messages are multiplexed with respect to each one random access preamble.

Each of the plurality of terminals may decode the plurality of RAR messages 1509-1 to 1509-6 based on the pieces of information 1503-1 to 1503-6 on the plurality of RAR messages. Each of the plurality of terminals may receive one RAR message of the plurality of RAR messages 1509-1 through 1509-6.

FIG. 15C illustrates MAC frames 1501 and 1515 including a plurality of RAR messages. The base station 100 may include the plurality of RAR messages in each of the plurality of MAC frames. The base station may transmit the plurality of MAC frames to the at least one terminal through a MTC channel or different subframes.

For example, the header 1503 may include information on RARs 1505-1 to 1505-3 included in a payload 1505. For example, information on the RAR 1505-1 may be included in 1503-1 of the header 1503. Information on the RAR 1505-2 may be included in 1503-2 of the header 1503. Likewise, information on the RAR 1505-3 may be included in 1503-3 of the header 1503. Further, the header 1517 may include information on RARs 1519-1 to 1519-3 included in a payload 1519. For example, information on the RAR 1519-1 may be included in 1517-1 of the header 1517. Further, information on the RAR 1519-2 may be included in 1517-2 of the header 1517. Likewise, information on the RAR 1519-3 may be included in 1517-3 of the header 1517.

According to the embodiment of the present disclosure, the header (1503 or 1517) of the MAC frame (1501 or 1515) may include information on a MTC control channel. For example, the header 1503 may include information 1523 on a MTC control channel of the MAC frame 1501 and information 1521 on a MTC data channel MTC CH 2. In addition, the header 1517 may include information 1527 on a MTC control channel of the MAC frame 1515 and information 1525 on a MTC data channel MTC CH 1.

Although FIG. 15C shows three pieces of information (1503-1 to 1503-3 or 1517-1 to 1517-3) on three RARs (1505-1 to 1505-3 or 1519-1 to 1519-3), the number of RARs and the number of pieces of information on the RARs may be less than three, or more than three according to another embodiment of the present disclosure.

In FIG. 15C, a first MAC frame may include a UL-Grant 1 for a random access preamble 1, a UL-Grant 2 for a random access preamble 2, and a UL-Grant 3 for a random access preamble 3. In addition, a second MAC frame may include a UL-Grant 4 for the random access preamble 1, a UL-Grant 5 for the random access preamble 2, and a UL-Grant 6 for the random access preamble 3.

Figure 16:
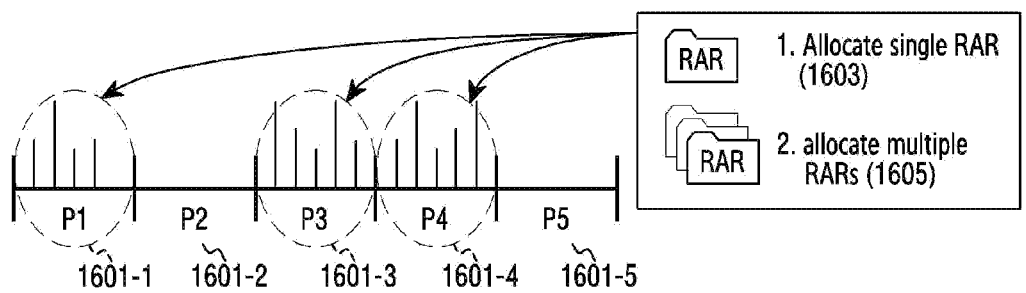
FIG. 16 illustrates a method for allocating a RAR message based on a correlation value in a wireless communication system according to an embodiment of the present disclosure.

FIG. 16 illustrates a method for allocating a RAR message based on a correlation value in a wireless communication system according to an embodiment of the present disclosure.

Referring to FIG. 16, a base station 100 may determine an auto-correlation value for all random access preambles received through each PRACH. The base station 100 may allocate a RAR message based on the auto-correlation value determined for each of the random access preambles. For example, the base station 100 may determine a predetermined criterion (for example, a threshold value) for the auto-correlation value. The base station 100 may determine the number of RAR messages to be allocated for a random access preamble corresponding to the calculated auto-correlation value based on the predetermined criterion and the determined auto-correlation value. For example, the base station 100 may determine an auto-correlation value for each of random access preambles 1 to 5 (1601-1 to 1601-5). The base station 100 determines whether to allocate (1603) one RAR message or to allocate (1605) a plurality of RAR messages based on the auto-correlation value determined for each of the random access preambles 1 to 5 (1601-1 to 1601-5).

For example, when the number of correlation values greater than the threshold value among auto-correlation values for the random access preamble 1 (1601-1) is less than the predetermined criterion, one RAR may be allocated (1603) for the random access preamble 1 (1601-1). When the number of correlation values greater than the threshold value among auto-correlation values for each of the random access preamble 3 (1601-3) and the random access preamble 4 (1601-4) exceeds the predetermined criterion, a plurality of RARs may be allocated (1605) for the random access preambles 3 and 4 (1601-3, 1601-4). When there are no auto-correlation values for the random access preamble 2 (1601-2) and the random access preamble 5 (1601-5), no RAR may be allocated for the random access preamble 2 (1601-2) and the random access preamble 5 (1601-5).

Figure 17:
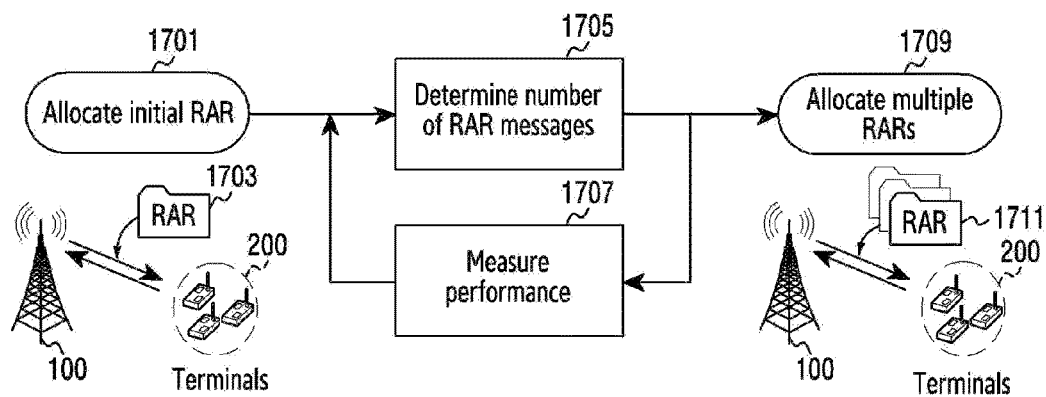
FIG. 17 illustrates a method for allocating a plurality of RAR messages in a wireless communication system according to an embodiment of the present disclosure.

FIG. 17 illustrates a method for allocating a plurality of RAR messages in a wireless communication system according to an embodiment of the present disclosure.

Referring to FIG. 17, a base station 100 may dynamically determine the number of RAR messages to be allocated in the next random access period based on the current random access state. For example, the base station 100 may receive the same one random access preamble from a plurality of terminals 200. The base station 100 may allocate (1701) one RAR message 1703 to the plurality of terminals 200 in response to the one random access preamble. The base station 100 may omit operation 1705 of compensating for the number of RAR messages after allocating the initial RAR message to the plurality of terminals 200.

The base station 100 may measure (1707) performance to check the random access state. For example, the base station 100 may periodically measure (1707) random access performance including at least one of a random access success rate, the average number of accessing terminals per unit time, an average access time, and available radio resources.

The base station 100 may determine a compensation value for the RAR message allocated to the plurality of terminals 200. The base station 100 may determine (1703) the number of RAR messages based on the random access performance. The base station may determine the number of RAR messages to be allocated in the next period based on the random access state. For example, the base station 100 may determine the number of RARs to be transmitted to the plurality of terminals 200 to be three based on the random access performance. The base station 100 may transmit the three RAR messages 1711 to the plurality of terminals 200.

Figure 18A:
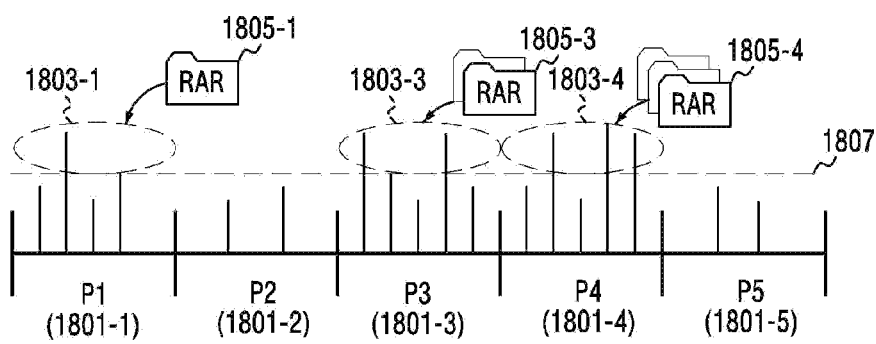
FIGS. 18A and 18B illustrate a method for allocating a plurality of RAR messages based on an auto-correlation value in a wireless communication system according to an embodiment of the present disclosure.
Figure 18B:
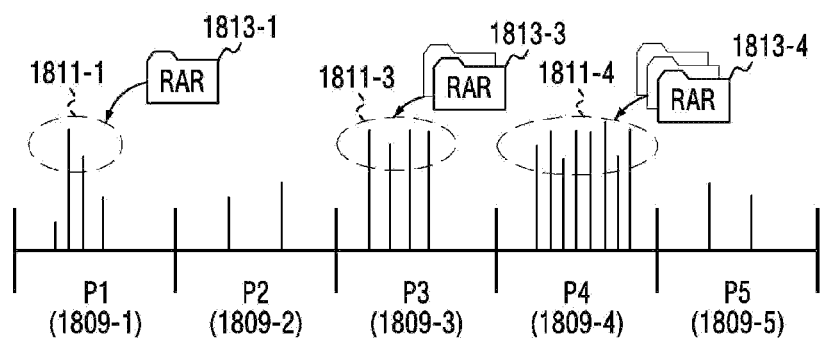

FIGS. 18A and 18B illustrate a method for allocating a plurality of RAR messages based on an auto-correlation value in a wireless communication system according to an embodiment of the present disclosure.

Referring to FIG. 18A, a base station 100 may calculate each auto-correlation value for each random access preamble in a PRACH. The base station 100 may determine the number of signal components exceeding a predefined threshold value among signal components of each auto-correlation value. The base station 100 may determine the number of random access preambles corresponding to the auto-correlation value exceeding the predefined threshold value 1807. The base station 100 may estimate the number of terminals that transmit the random access preamble based on the number of the random access preambles. The base station 100 may allocate as many RAR messages in response to the random access preamble as the number of the random access preambles.

For example, the base station 100 may determine the threshold value 1807 of the correlation value of the random access preamble. The base station 100 may determine the number of signal components exceeding the threshold value 1807 with respect to the random access preamble. The base station 100 may determine the number of RAR messages in response to the random access preamble based on the number of signal components exceeding the threshold value 1807. The base station 100 may allocate a determined number of RAR messages for the random access preamble.

For example, the base station 100 may calculate an auto-correlation value for each of random access preambles 1 to 5 (1801-1 to 1801-5). The base station 100 may calculate the number of signal components exceeding the predetermined threshold value 1807 among the signal components of the auto-correlation value for the random access preamble 1 (1801-1). For example, the number of signal components exceeding the predetermined threshold value 1807 among the signal components of the auto-correlation value for the random access preamble 1 (1801-1) may be one (1803-1). Here, the base station 100 may allocate one RAR message (1805-1) for the random access preamble 1 (1801-1).

For example, when the number of signal components exceeding the threshold value 1807 among the signal components of the auto-correlation value for the random access preamble 3 (1801-3) is two (1803-3), the base station 100 may allocate two RAR messages (1805-3) for the random access preamble 3 (1801-3). For example, when the number of signal components exceeding the threshold value 1807 among the signal components of the auto-correlation value for the random access preamble 4 (1801-4) is three (1803-4), the base station 100 may allocate three RAR messages (1805-4) for the random access preamble 4 (1801-4).

When there is no signal component exceeding the threshold value 1807 among the signal components of the auto-correlation value for the random access preamble 2 (1801-2), the base station 100 may allocate no RAR message for the preamble 2 (1801-2). Likewise, when there is no signal component exceeding the threshold value among the signal components of the auto-correlation value for the preamble 5 (1801-5), the base station 100 may allocate no RAR message for the preamble 5 (1801-5).

Referring to FIG. 18B, the base station 100 may measure the reception power of each of random access preambles received from at least one terminal. The base station may estimate the number of terminals that have transmitted the respective random access preambles based on the reception power of each of the random access preambles. The base station may measure the average of uplink path loss values based on a Sounding Reference Signal (SRS) from the plurality of terminals. The base station may determine the average of uplink path loss values as an expected path loss value in the case where terminals located within the coverage of the base station transmit a preamble via a PRACH. The base station may periodically determine the expected reception power value of a received random access preamble based on the uplink path loss value. The base station may measure the sum of reception powers of all signal components with respect to a random access preamble i received in each PRACH. The base station may determine the number of RAR messages to be allocated for the random access preamble i based on the expected reception power value of the random access preamble. For example, the base station may determine the number of RAR messages according to Equation 1 below.

$$N_{RAR}^{i} = \frac{P_i}{P_{expected}} \qquad \text{Equation 1}$$

Here, $P_i$ is the sum of reception powers of all signal component with respect to a random access preamble i. $P_{expected}$ is an expected reception power value in the reception of a preamble from each terminal. $N_{RAR}^{i}$ is the number of RAR messages to be allocated for the random access preamble i.

According to an embodiment of the present disclosure, the base station may determine the average number of transmission times with respect to all random access preambles received by the base station. Here, the base station may determine the expected reception power value according to Equation 2 below.

$$P_{expected} = P_{initial} + \delta + P_{ramping} * N_{transcounter} + P_{pathloss} \qquad \text{Equation 2}$$

Here, $P_{expected}$ is an expected reception power value in the reception of a preamble from each terminal. $P_{initial}$ is the initial transmission power of a random access preamble. $P_{ramping}$ is a transmission power value that increases whenever the random access preamble is retransmitted. $N_{transcounter}$ is the average number of times the random access preamble is transmitted. $P_{pathloss}$ is the average value of uplink path loss values. $\delta$ is a power correction value according to the format of the random access preamble.

According to another embodiment of the present disclosure, when the base station does not determine the average number of transmission times with respect to the random access preamble, the base station may determine the expected reception power value according to Equation 3 below.

$$P_{expected} = P_{initial} + \delta + P_{pathloss} * P_{initial} + P_{ramping} * N_{maxtrans} + P_{pathloss} \qquad \text{Equation 3}$$

Here, $P_{expected}$ is an expected reception power value in the reception of a preamble from each terminal. $P_{initial}$ is the initial transmission power of a random access preamble. $P_{ramping}$ is a transmission power value that increases whenever the random access preamble is retransmitted. $N_{maxtrans}$ is the maximum number of retransmission times allowed for the random access preamble. $P_{pathloss}$ is the average value of uplink path loss values. $\delta$ is a power correction value according to the format of the random access preamble.

For example, the base station 100 may allocate one RAR message (1813-1) for a random access preamble 1 (1809-1) based on the expected reception power value (1811-1) of the random access preamble 1 (1809-1). The base station 100 may allocate two RAR messages (1813-3) for a random access preamble 3 (1809-3) based on the expected reception power value (1811-3) of the random access preamble 3 (1809-3). Likewise, the base station 100 may allocate three RAR messages (1813-4) for a random access preamble 4 (1809-4) based on the expected reception power value (1811-4) of the random access preamble 4 (1809-4).

On the other hand, when no expected reception power value is measured for a random access preamble 2 (1809-2)

and a random access preamble 5 (1809-5), the base station 100 may allocate no RAR message for the random access preamble 2 (1809-2) and the random access preamble 5 (1809-5).

Figure 19A:
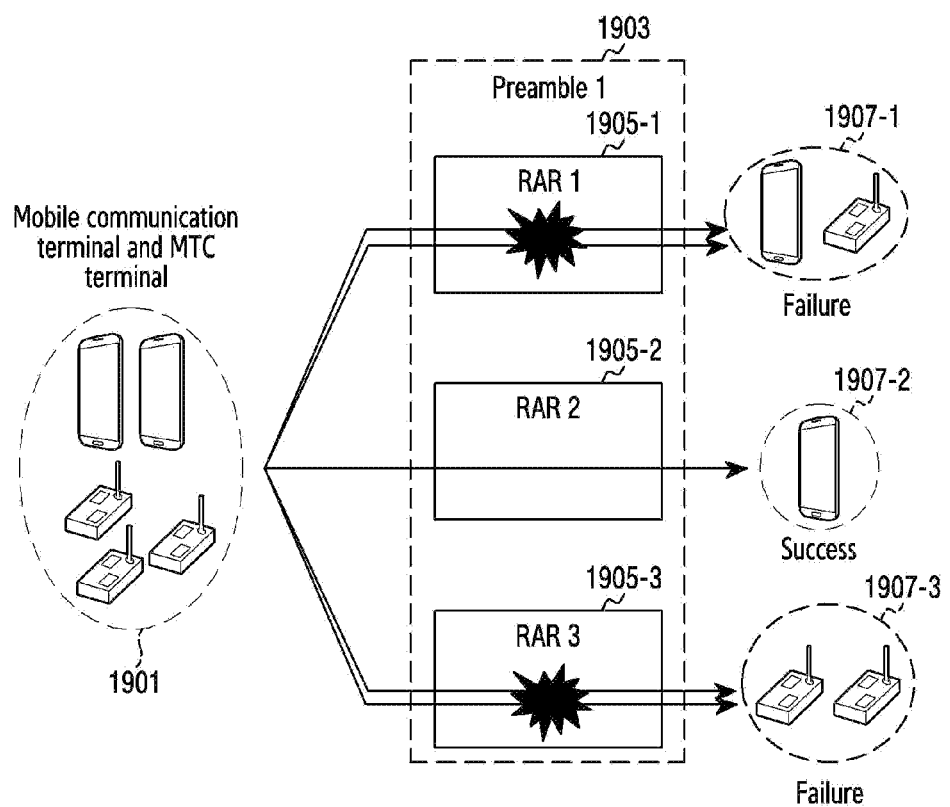
FIGS. 19A and 19B illustrate a method for managing integrated random access for a mobile communication terminal and a MTC terminal in a wireless communication system according to an embodiment of the present disclosure.
Figure 19B:
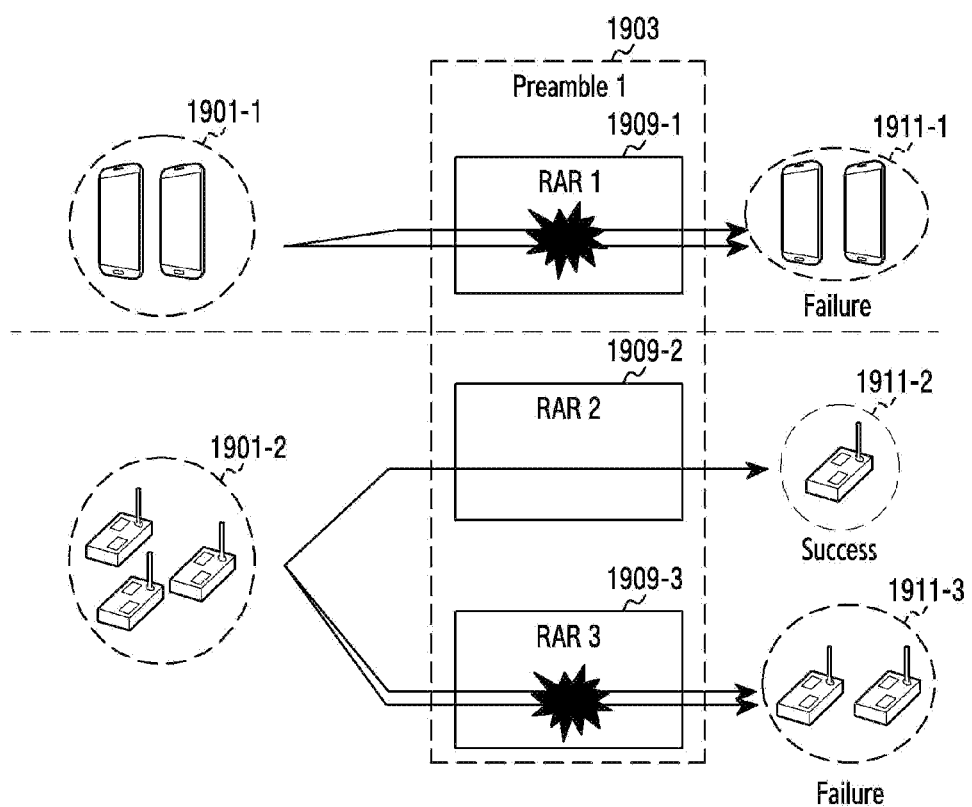

FIGS. 19A and 19B illustrate a method for managing integrated random access for a mobile communication terminal and a MTC terminal in a wireless communication system according to an embodiment of the present disclosure.

Referring to FIG. 19A, a base station 100 may allocate a plurality of RAR messages (1905-1 to 1905-3) for a preamble 1 (1903). For example, the base station 100 may transmit the plurality of RAR messages (1905-1 to 1905-3) to all terminals (1901) regardless of the mobile communication terminal and the MTC terminal. All of the terminals (1901) may determine one random access preamble message corresponding to a random access preamble transmitted by the terminals (1901) among the plurality of RAR messages received from the base station 100. All of the terminals (1901) may transmit a msg3 to the base station based on UL-Grant information included in each selected one RAR message. Here, when at least two terminals among the plurality of terminals (1901) select the same RAR message, msg3s transmitted by the at least two terminals may collide with each other in an uplink. For example, when two terminals among the plurality of terminals (1901) select a RAR 1 message (1905-1), msg3s transmitted respectively by the two terminals may collide with each other in the uplink. Accordingly, the two terminals fail (1907-1) in random access to the base station 100. Likewise, when two other terminals among the plurality of terminals (1901) select a RAR 3 message (1905-3), msg3s transmitted respectively by the two other terminals may collide with each other in the uplink. Accordingly, the two other terminals fail (1907-3) in random access to the base station 100.

On the other hand, when one terminal among the plurality of terminals (1901) selects one RAR message, the one terminal can succeed in random access to the base station 100. For example, when the one terminal selects a RAR 2 message (1905-2), the one terminal can successfully transmit a msg3 to the base station 100 through the uplink. Accordingly, the one terminal can succeed (1907-2) in the random access to the base station 100.

Referring to FIG. 19B, the base station 100 may transmit a plurality of RAR messages (1909-1 to 1909-3) separately to the mobile communication terminal (1901-1) and the MTC terminal (1901-2). The mobile communication terminal (1901-1) and the MTC terminal (1901-2) may select a RAR message based on at least one of the type of the terminal, the type of a service, and a random access preamble transmitted by the terminal. For example, the mobile communication terminal (1901-1) may select a RAR 1 message (1909-1) among a plurality of RAR messages (1909-1 to 1909-3) allocated for a preamble 1 (1903). Further, the MTC terminal (1901-2) may select one of a RAR 2 message (1909-2) and a RAR 3 message (1909-3) excluding the RAR 1 message (1909-1) from the plurality of RAR messages (1909-1 to 1909-3). That is, the base station 100 may allocate different RAR messages to the mobile communication terminal (1901-1) and the MTC terminal (1901-2) so that the mobile communication terminal (1901-1) and the MTC terminal (1901-2) may perform a random access procedure with the base station 100 based on the different RAR messages. According to another embodiment of the present disclosure, the mobile communication terminal 1901-1 may select one of the RAR 1 (1909-1), the RAR 2 (1909-2), and the RAR 3 (1909-3), instead of selecting only the RAR 1 (1909-1).

Figure 20A:
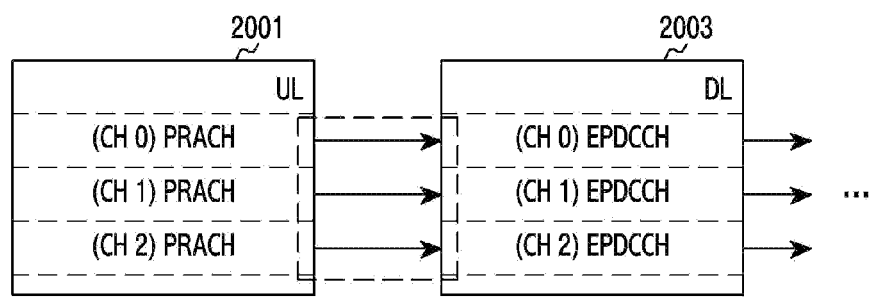
FIGS. 20A to 20C illustrate a method for mapping an uplink channel and a downlink channel according to an embodiment of the present disclosure.
Figure 20B:
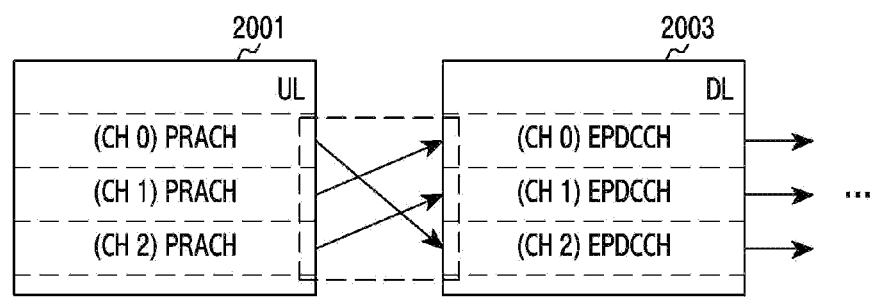
Figure 20C:
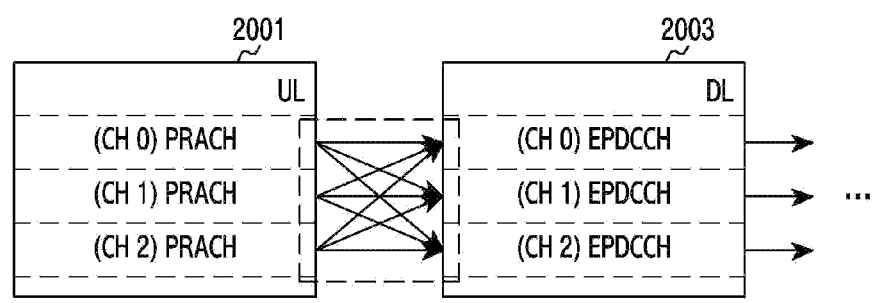

FIGS. 20A to 20C illustrate a method for mapping an uplink channel and a downlink channel according to an embodiment of the present disclosure.

Referring to FIG. 20A, each PRACH may be linearly connected to each EPDCCH located in the same channel. That is, each PRACH may be mapped to each EPDCCH at 1:1. Here, a terminal may perform the entire random access procedure with a base station in a channel selected by the terminal. The terminal performs the entire random access procedure with the base station in one selected channel, thus reducing the complexity of the terminal.

For example, a PRACH of a CH 0 in an uplink 2001 may correspond to an EPDCCH of a CH 0 in a downlink 2003. For example, a PRACH of a CH 1 in the uplink 2001 may correspond to an EPDCCH of a CH 1 in the downlink 2003. For example, a PRACH of a CH 2 in the uplink 2001 may correspond to an EPDCCH of a CH 2 in the downlink 2003.

Referring to FIG. 20B, each PRACH may be mapped to each EPDCCH located in a different channel. Here, after transmitting a random access preamble to the base station, the terminal may perform frequency shift to a control channel of a channel other than a channel used transmit the random access preamble. The terminal may partially avoid interference and selective fading occurring in each frequency channel through the frequency shift.

For example, the PRACH of the CH 0 in the uplink 2001 may correspond to the EPDCCH of the CH 2 in the downlink 2003. For example, the PRACH of the CH 1 in the uplink 2001 may correspond to the EPDCCH of the CH 0 in the downlink 2003. For example, the PRACH of the CH 2 in uplink 2001 may correspond to the EPDCCH of the CH 1 in downlink 2003.

Referring to FIG. 20C, each PRACH may be mapped to all EPDCCHs located in different channels. For example, the PRACH of the CH 0 in the uplink 2001 may correspond to the EPDCCH of the CH 0, the EPDCCH of the CH 1, and the EPDCCH of the CH 2 in the downlink 2003. Also, the PRACH of the CH 1 in the uplink 2001 may correspond to the EPDCCH of the CH 0, the EPDCCH of the CH 1, and the EPDCCH of the CH 2 in the downlink 2003. In addition, the PRACH of the CH 2 in the uplink 2001 may correspond to the EPDCCH of the CH 0, the EPDCCH of the CH 1, and the EPDCCH of the CH 2 in the downlink 2003.

In various embodiments, 1:n channel mapping may be possible based on a channel change. For example, the PRACH of the CH 0 in the uplink 2001 may be mapped to the EPDCCH of the CH 0 in the downlink 2003 at a first time point; the PRACH of the CH 0 in the uplink 2001 may be mapped to the EPDCCH of the CH 1 in the downlink 2003 at a second time; and the PRACH of the CH 0 in the uplink 2001 may be mapped to the EPDCCH of the CH 2 in the downlink 2003 at a third time point.

Figure 21A:
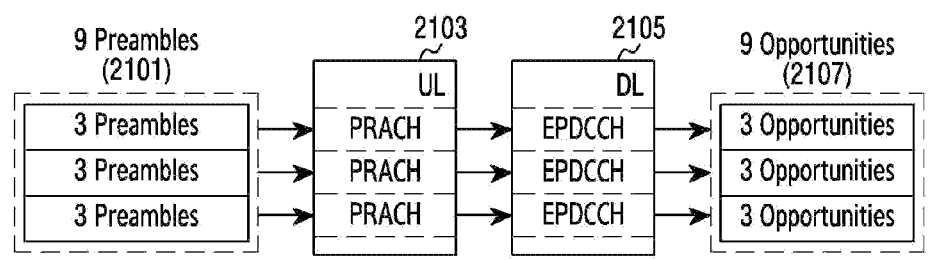
FIGS. 21A and 21B illustrate a method in which a terminal uses a plurality of downlink channels for one uplink channel in a wireless communication system according to an embodiment of the present disclosure.
Figure 21B:
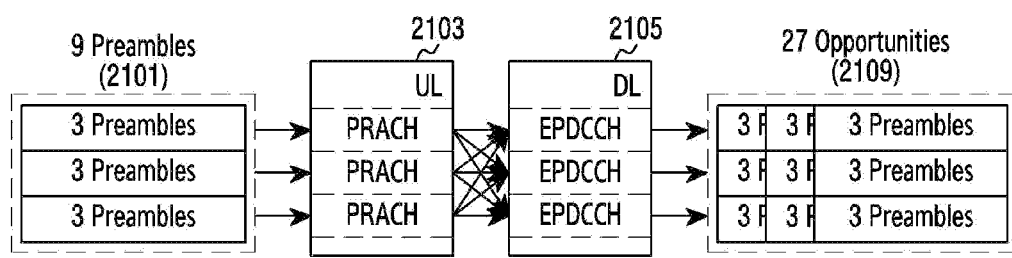

FIGS. 21A and 21B illustrate a method in which a terminal uses a plurality of downlink channels for one uplink channel in a wireless communication system according to an embodiment of the present disclosure.

Referring to FIG. 21A, each of three terminals may transmit one random access preamble to a base station 100 through one EPDCCH corresponding to each one PRACH. That is, three random access opportunities may occur for the three random access preambles. For example, one random access preamble transmitted by one terminal to the base station may include a Random Access Preamble Identifier (RAPID). The one random access preamble may determine one EPDCCH based on a Random Access-Radio Network Temporary Identifier (RA-RNTI) of a PRACH corresponding to the random access preamble identifier.

The base station 100 may associate one Random Access-Radio Network Temporary Identifier (RA-RNTI) with one random access preamble identifier. For example, the base station may determine the random access radio network temporary identifier through Equation 4 below.

$$\text{RA-RNTI}=1+T_{id}+10*F_{id} \qquad \text{Equation 4}$$

Here RA-RNTI is the random access radio network temporary identifier. $T_{id}$ is the index of a subframe ($0 \le T_{id} < 10$). $F_{id}$ is the index of a PRACH in the subframe ($0 \le F_{id} < 60$).

For example, the base station 100 may receive three preambles through a PRACH of an uplink 2103. The base station 100 may allocate one RAR message for each of the three preambles. That is, the base station 100 may transmit three RAR messages through an EPDCCH of a downlink 2105. Thus, three random access opportunities may occur for the three preambles. That is, a total of nine random access opportunities (2107) may occur for nine preambles (2101).

Referring to FIG. 21B, each of the three terminals may transmit one random access preamble to the base station through three EPDCCHs corresponding one PRACH. Here, each of the three terminals transmits one random access preamble to the base station through the three EPDCCHs and thus may have a total of three random access opportunities for the one random access preamble.

For example, the base station 100 may determine the random access radio network temporary identifier through Equation 5 below.

$$\text{RA-RNTI}=1+T_{id}+10*F_{id}+N_{MTC\text{-}CH}*F_{MTC\text{-}CH} \qquad \text{Equation 5}$$

Here RA-RNTI is the random access radio network temporary identifier. $T_{id}$ is the index of a subframe ($0 \le T_{id} < 10$). $F_{id}$ is the index of a PRACH in the subframe ($0 \le F_{id} < 60$). $N_{MTC\text{-}CH}$ is the number of allocated MTC channels. $F_{MTC\text{-}CH}$ is the position of a MTC channel to which the terminal shifts.

For example, the base station 100 may receive the three preambles through the PRACH of the uplink 2103. Here, the base station 100 may transmit a RAR message for each of the three preambles through three EPDCCHs of the downlink 2105. That is, the base station 100 may transmit a RAR message for each of three preambles through three downlink EPDCCHs. In order words, three random access opportunities for each of the three preambles, that is, a total of nine random access opportunities for the three preambles, may occur. Thus, a total of 27 random access opportunities (2109) may occur for nine random access preambles.

Figure 22:
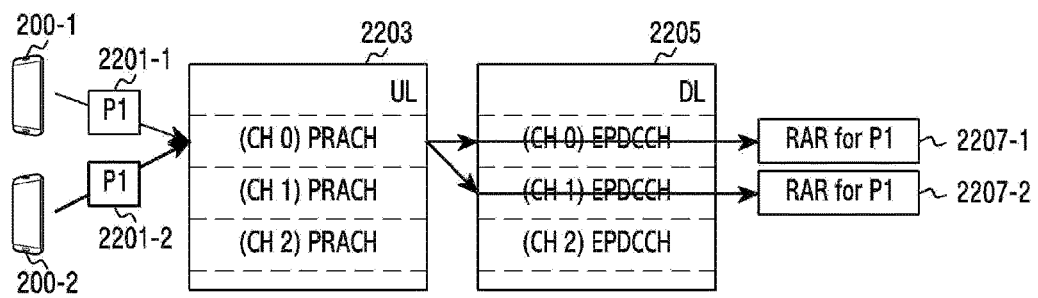
FIG. 22 illustrates a method in which a base station determines a random access radio network temporary identifier for identifying a terminal attempting random access in a wireless communication system according to an embodiment of the present disclosure.

FIG. 22 illustrates a method in which a base station determines a random access radio network temporary identifier for identifying a terminal attempting random access in a wireless communication system according to an embodiment of the present disclosure.

Referring to FIG. 22, the base station 100 may determine a RA-RNTI in order to identify a PRACH in an uplink 2203 used by at least one terminal in a downlink EPDCCH. In the wireless communication system according to the embodiment of the present disclosure, when there are a plurality of PRACHs and a plurality of low-cost MTC channels, the at least one terminal may use a PRACH in a particular MTC channel and may then shift to another MTC channel. Accordingly, the base station 100 may determine the RA-RNTI based on the position of the channel to which the terminal has shifted in order to identify the at least one terminal that has shifted to the other MTC channel.

For example, each of a terminal 200-1 and a terminal 200-2 may transmit the same preamble 1 (2201-1 and 2201-2) to the base station 100 through a PRACH of a CH 0 in the uplink 2203. The base station 100 may determine to transmit a RAR message in response to the preamble 1 through an EPDCCH of a CH 0 and an EPDCCH of a CH 1 in a downlink 2205 according to Equation 5. Accordingly, the base station 100 may transmit two RAR messages (2207-1 and 2207-2) in response to the preamble 1.

Figure 23A:
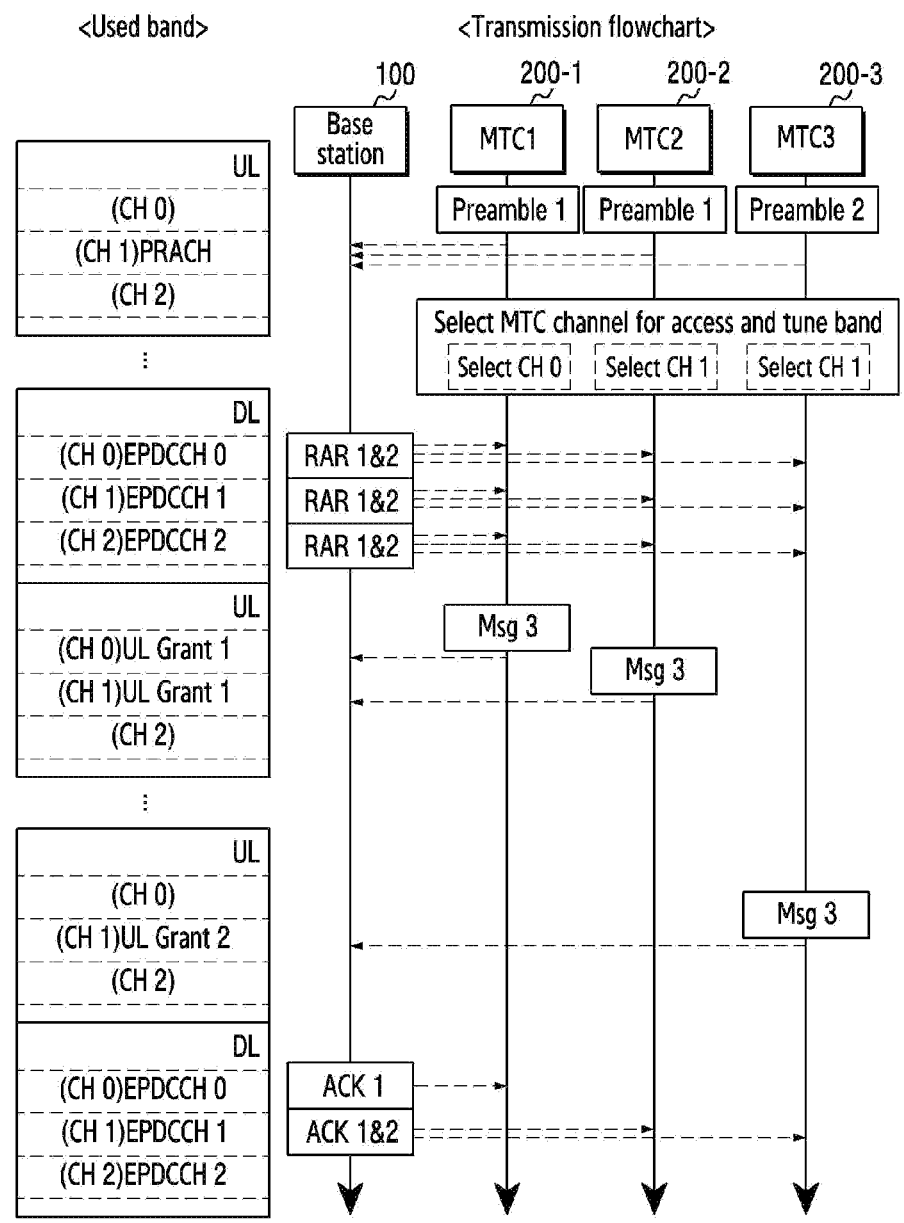
FIGS. 23A and 23B illustrate signal flow between a base station and terminals for transmitting a plurality of RAR messages through a plurality of downlink MTC channels corresponding to one PRACH in a wireless communication system according to an embodiment of the present disclosure.
Figure 23B:
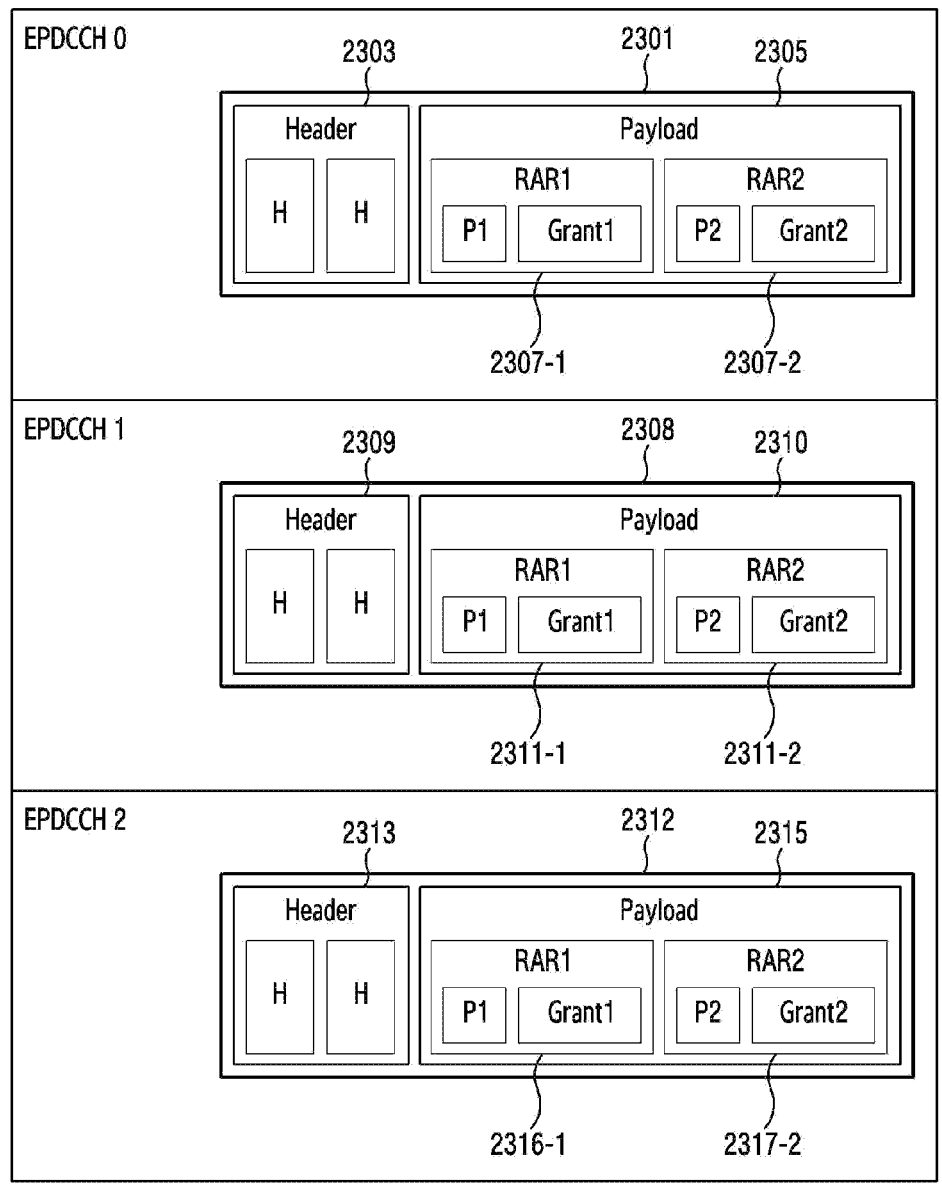

FIGS. 23A and 23B illustrate signal flow between a base station and terminals for transmitting a plurality of RAR messages through a plurality of downlink MTC channels corresponding to one PRACH in a wireless communication system according to an embodiment of the present disclosure.

Referring to FIG. 23A, the MTC terminal 1 to the MTC terminal 3 (200-1 to 200-3) may receive a SIB from the base station 100. The SIB may include information on a plurality of data channels. Each of the MTC terminal 1 to the MTC terminal 3 (200-1 to 200-3) may transmit a random access preamble to the base station through a PRACH located in a particular channel among all channels based on the SIB. For example, each of the MTC terminal 1 (200-1) and the MTC terminal 2 (200-2) transmits a preamble 1 to the base station through a PRACH of a CH 1 in an uplink. Further, the MTC terminal 3 (200-3) transmits a preamble 2 to the base station through the PRACH of the CH 1 in the uplink.

The MTC terminal 1 to the MTC terminal 3 (200-1 to 200-3) may select a MTC channel to access based on the SIB. In addition, the MTC terminal 1 to the MTC terminal 3 (200-1 to 200-3) may determine a frequency band to use. According to the embodiment of the present disclosure, the MTC terminal 1 to the MTC terminal 3 (200-1 to 200-3) may select a 1.4-MHz narrowband channel. Further, the MTC terminal 1 to the MTC terminal 3 (200-1 to 200-3) may shift the frequency band to a MTC control channel and a data channel positioned in the 1.4-MHz narrowband channel.

For example, the MTC terminal 1 (200-1) may select a CH 0. Further, each of the MTC terminal 2 (200-2) and the MTC terminal 3 (200-3) may select a CH 1. The base station may transmit RAR messages in response to the respective random access preambles respectively received from the MTC terminal 1 to the MTC terminal 3 (200-1 to 200-3) in parallel through the respective channels.

The base station may transmit, to the MTC terminal 1 to the MTC terminal 3 (200-1 to 200-3), a MAC frame 2301 including the RAR messages 2307-1 and 2307-2 through the CH 0, a MAC frame 2308 including the RAR messages 2311-1 and 2311-2 through the CH 1, and a MAC frame 2312 including the RAR messages 2316-1 and 2317-2 through the CH 2, as illustrated in FIG. 23B. For example, a header 2303 of the MAC frame 2301 may include information on the RAR messages 2307-1 to 2307-2.

A payload 2305 of the MAC frame 2301 may include the RAR 2307-1 indicating that a Grant 1 is allocated on the CH 0 for a random access preamble 1. In addition, the payload 2305 of the MAC frame 2301 may include the RAR 2307-2 indicating that a Grant 2 is allocated on the CH 0 for a random access preamble 2.

The base station 100 may transmit the MAC frames 2301, 2308, and 2312 to the MTC terminal 1 to the MTC terminal 3 (200-1 to 200-3) respectively through an EPDCCH 0, an EPDCCH 1, and an EPDCCH 2 on a plurality of MTC channels. That is, the base station 100 may receive a random access preamble from each of the MTC terminal 1 to the MTC terminal 3 (200-1 to 200-3) through one channel in the uplink and may transmit a RAR to each of the MTC terminal 1 to the MTC terminal 3 (200-1 to 200-3) through a plurality of channels in the downlink.

The MTC terminal 1 (200-1) transmits a msg3 to the base station 100 through the CH 0 according to the UL Grant 1 included in the RAR 1 (2307-1). In addition, the MTC terminal 2 (200-2) transmits a msg3 to the base station 100 through the CH 1 according to the UL Grant 1 included in the RAR 1 (2311-1). The MTC terminal 3 (200-3) transmits a msg3 to the base station 100 through CH 1 according to the UL Grant 2 included in the RAR 2 (2311-2).

The base station 100 transmits an ACK 1 to the MTC terminal 1 (200-1) through the EPDCCH 0 of the CH 0. The base station 100 transmits ACKs 1 and 2 to the MTC terminal 2 (200-2) and the MTC terminal 3 (200-3) through the EPDDCH 1 of the CH 1.

Figure 24A:
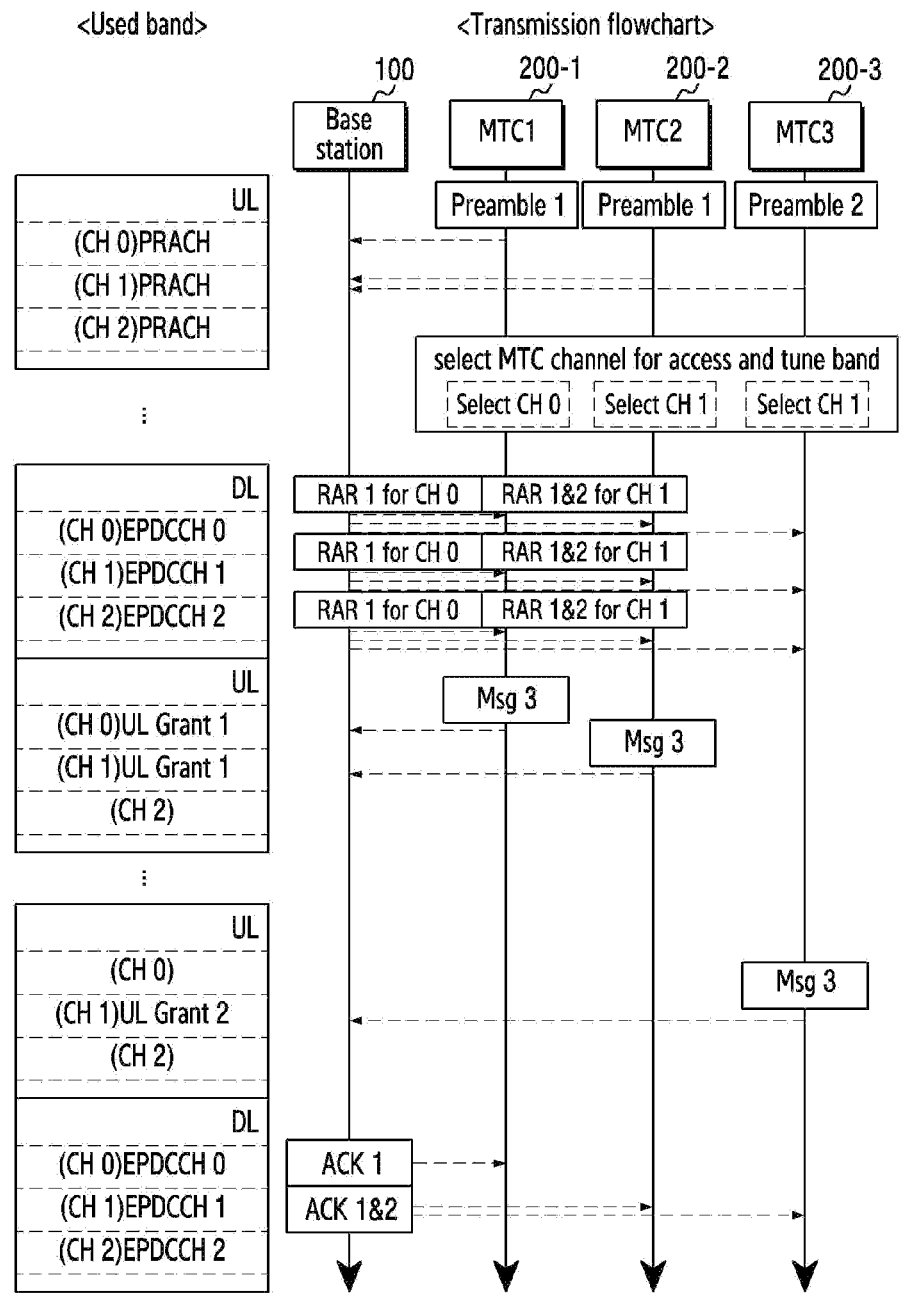
FIGS. 24A and 24B illustrate signal flow between a base station and terminals for transmitting a plurality of RAR messages through a plurality of downlink MTC channels corresponding to a plurality of PRACHs in a wireless communication system according to an embodiment of the present disclosure.
Figure 24B:
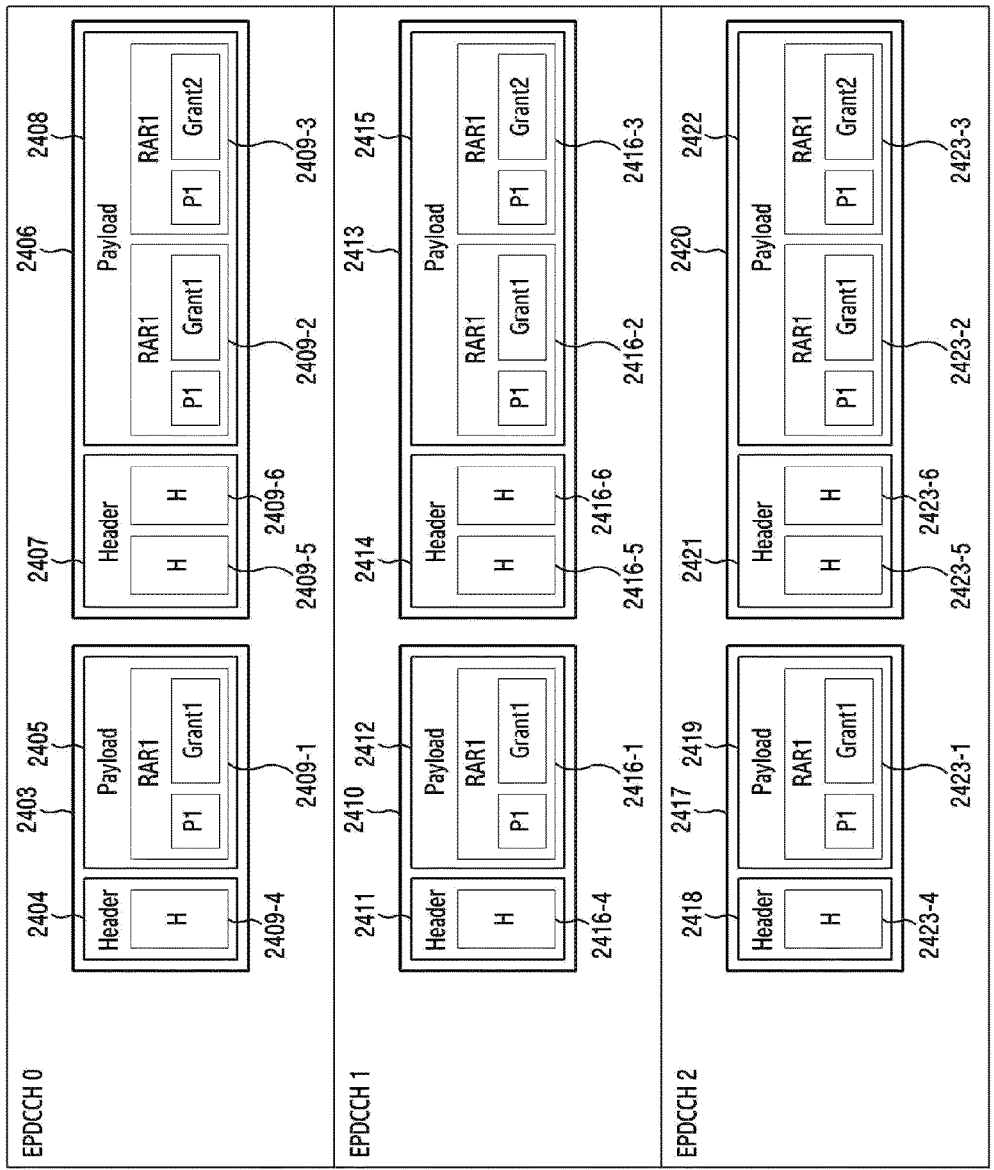

FIGS. 24A and 24B illustrate signal flow between a base station and terminals for transmitting a plurality of RAR messages through a plurality of downlink MTC channels corresponding to a plurality of PRACHs in a wireless communication system according to an embodiment of the present disclosure.

Referring to FIG. 24A, each of the MTC terminal 1 to the MTC terminal 3 (200-1 to 200-3) may select one of a plurality of PRACHs based on a SIB received from the base station 100. Each of the MTC terminal 1 to the MTC terminal 3 (200-1 to 200-3) may transmit a random access preamble to the base station 100 via the selected PRACH. For example, the MTC terminal 1 (200-1) transmits a random access preamble 1 to the base station 100 via a PRACH of a CH 0. The MTC terminal 2 (200-2) and the MTC terminal 3 (200-3) respectively transmit the random access preamble 1 and a random access preamble 2 to the base station 100 via a PRACH of a CH 1. The MTC terminal 1 to the MTC terminal 3 (200-1 to 200-3) may select a MTC channel to access and may determine a frequency band to use. For example, the MTC terminal 1 (200-1) may select a CH 0. Further, the MTC terminal 2 (200-2) and the MTC terminal 3 (200-3) may select a CH 1.

The base station 100 may transmit, to the MTC terminal 1 to the MTC terminal 3 (200-1 to 200-3), MAC frames 2403 and 2406 through an EPDCCH 0 of a CH 0, MAC frames 2410 and 2413 through an EPDCCH 1 of a CH 1, and MAC frames 2417 and 2420 through an EPDCCH 2 of a CH 2, as illustrated in FIG. 24B. A header 2404 of the MAC frame 2403 may include information on RARs 2409-1, and a header 2407 of the MAC frame 2406 may include information on RARs 2409-2 and 2409-3. For example, the header 2404 may include information 2409-4 indicating that the RAR 1 (2409-1) is allocated for the CH 0. In addition, the header 2407 may include information 2409-5 indicating that the RAR 1 (2409-2) is allocated for the CH 1. In addition, the header 2407 may include information 2409-6 indicating that the RAR 1 (2409-3) is allocated for the CH 1.

In addition, a payload 2405 of the MAC frame 2403 may include the RARs 2409-1, and a payload 2408 of the MAC frame 2406 may include the RARs 2409-2 and 2409-3. Each of the RARs 2409-1 to 2409-3 may include grant information corresponding to a mapped random access preamble. For example, the RAR 1 (2409-1) may include information indicating that a Grant 1 is allocated on the CH 0 for the random access preamble 1 transmitted via the CH 0. In addition, the RAR 1 (2409-2) may include information indicating that a Grant 1 is allocated on the CH 1 for the random access preamble 1 transmitted via the CH 1. The RAR 2 (2409-3) may include information indicating that a Grant 2 is allocated on the CH 1 for the random access preamble 2 transmitted via the CH 1.

That is, the base station 100 may receive a random access preamble from each of the MTC terminal 1 to the MTC terminal 3 (200-1 to 200-3) through a channel in the uplink corresponding to each of the MTC terminal 1 to the MTC terminal 3 (200-1 to 200-3) and may transmit a MAC frame including a RAR in response to the random access preamble to the MTC terminal 1 to the MTC terminal 3 (200-1 to 200-3) through each of a plurality of channels in the downlink. In other words, the base station 100 may receive a random access preamble through a plurality of uplink channels from the MTC terminals (200-1 to 200-3) and may transmit a RAR message to the MTC terminals (200-1 to 200-3) through a plurality of downlink channels.

The MTC terminal 1 (200-1) transmits a msg3 to the base station 100 through the CH 0 according to the UL Grant 1 on the CH 0 in the RAR 1 (2409-1). In addition, the MTC terminal 2 (200-2) transmits a msg3 to the base station 100 through the CH 1 according to the UL Grant 1 on the CH 1 the RAR 1 (2409-2). The MTC terminal 3 (200-3) transmits a msg3 to the base station 100 through CH 1 according to the UL Grant 2 on the CH 1 in the RAR 1 (2409-3).

The base station 100 transmits an ACK 1 to the MTC terminal 1 (200-1) through the EPDCCH 0 of the CH 0. The base station 100 transmits an ACK 1 and an ACK 2 respectively to the MTC terminal 2 (200-2) to the MTC terminal 3 (200-3) through the EPDCCH 1 of the CH 1.

Figure 25A:
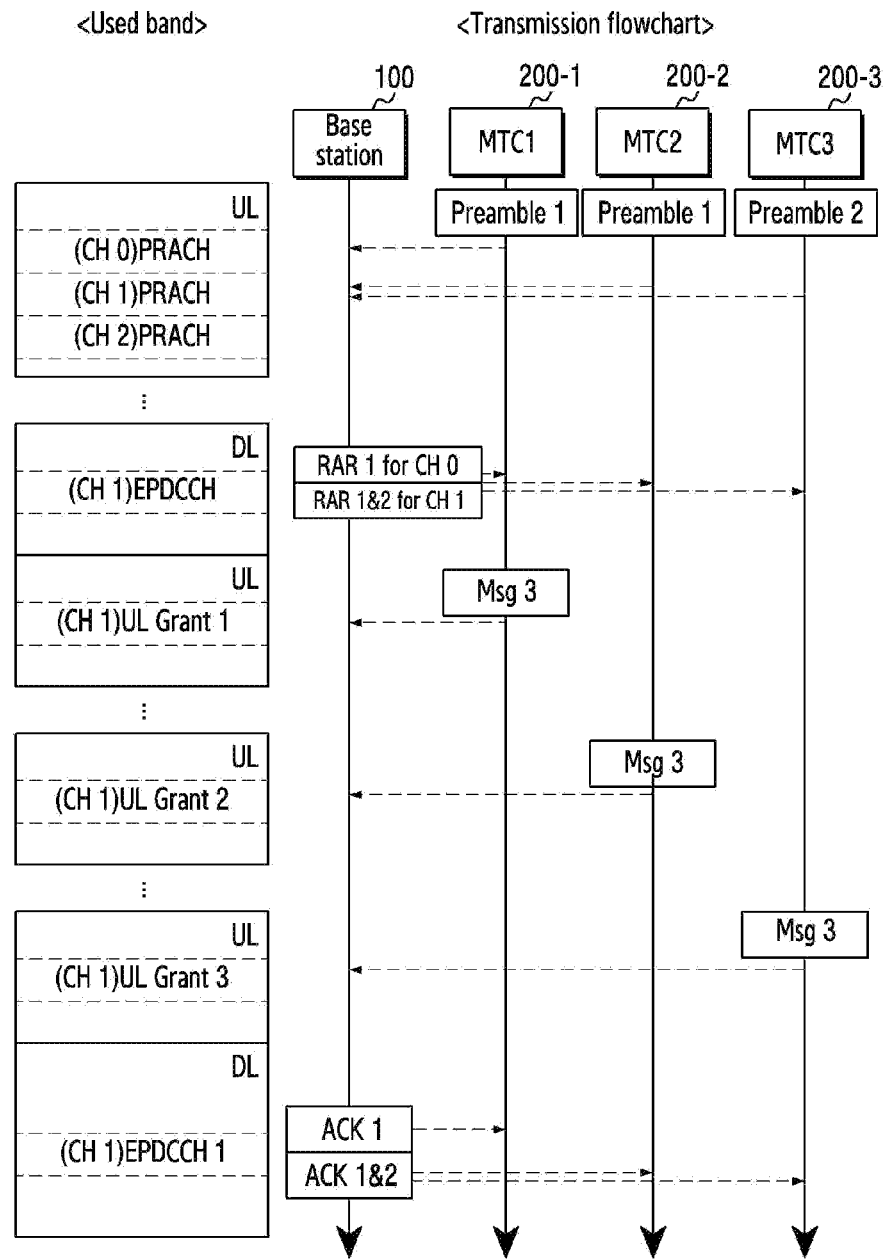
FIGS. 25A and 25B illustrate signal flow between a base station and terminals for transmitting a plurality of RAR messages through one downlink MTC channel corresponding to a plurality of PRACHs in a wireless communication system according to an embodiment of the present disclosure.
Figure 25B:
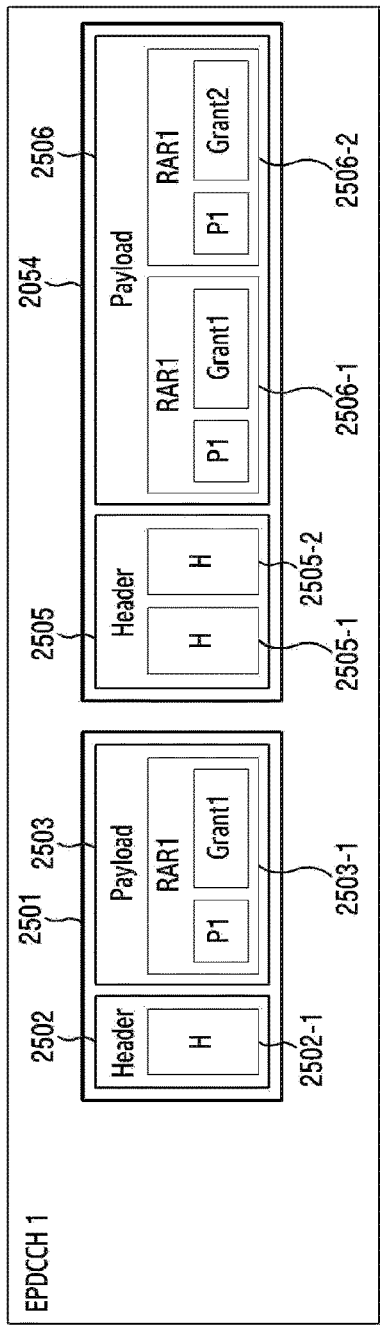

FIGS. 25A and 25B illustrate signal flow between a base station and terminals for transmitting a plurality of RAR messages through one downlink MTC channel corresponding to a plurality of PRACHs in a wireless communication system according to an embodiment of the present disclosure.

Referring to FIG. 25A, a MTC terminal 1 (200-1) transmits a random access preamble 1 to the base station 100 through a PRACH of a CH 0 in an uplink. A MTC terminal 2 (200-2) transmits a random access preamble 1 to the base station 100 through a PRACH of a CH 1 in the uplink. A MTC terminal 3 (200-3) transmits a random access preamble 2 to the base station 100 through the PRACH of the CH 1 in the uplink. That is, the base station 100 may receive a random access preamble from the MTC terminals 200-1 through 200-3 through a plurality of channels in the uplink.

The base station 100 transmits a RAR to the MTC terminals 200-1 to 200-3 through an EPDCCH of a CH 1 in a downlink. The base station 100 may transmit a MAC frame 2501 including the RAR for the preamble transmitted through the CH 0 and a MAC frame 2054 including the RAR for the preamble transmitted through the CH 1 to the MTC terminals 200-1 to 200-3. Referring to FIG. 25B, a header 2502 of the MAC frame 2501 may include information on the allocation of RARs 2503-1 allocated corresponding to the preamble 1 transmitted through the CH 0, and a header 2505 of the MAC frame 2504 may include information on the allocation of RARs 2506-1 and 2506-2 allocated corresponding to the preambles 1 and 2 transmitted through the CH 1. For example, the header 2502 may include information 2502-1 indicating that the RAR 1 (2503-1) is allocated for the preamble 1 transmitted through the CH 0. In addition, the header 2505 may include information 2505-1 indicating that the RAR 1 (2506-1) is allocated for the preamble 1 transmitted through the CH 1. Also, the header 2505 may include information 2505-2 indicating that the RAR 2 (2506-2) is allocated for the preamble 2 transmitted through the CH 1.

A payload 2503 of the MAC frame 2501 may include the RAR 1 (2503-1) for the random access 1. The RAR 1 (2503-1) may include a Grant 1 allocated for the random access preamble 1. Further, a payload 2506 may include the RAR 1 (2506-1) including the random access preamble 1 and a Grant 2 allocated for the random access preamble 1. In addition, the payload 2506 may include the RAR 2 (2506-2) including the random access preamble 2 and a Grant 3 allocated for the random access preamble 2.

That is, the base station 100 may receive random access preambles from MTC terminals through a plurality of channels and may transmit RARs to the MTC terminals through one channel allocated for the random access preambles.

The MTC terminal 1 (200-1) transmits a msg3 through the CH 1 in the uplink according to the Grant 1 included in the RAR 1 (2503-1). The MTC terminal 2 (200-2) transmits a msg3 through the CH 1 in the uplink according to the Grant 2 included in the RAR 1 (2506-1). The MTC terminal 3 (200-3) transmits a msg3 through the CH 1 in the uplink according to the Grant 3 included in the RAR 2 (2506-2).

The base station 100 transmits an ACK 1 to the MTC 1 (200-1) through the EPDCCH 1 of the CH 1 in the downlink. Also, the base station 100 transmits an ACK 1 and an ACK 2 to the MTC terminal 2 (200-2) and the MTC terminal 3 (200-3) through the EPDCCH 1 of the CH 1 in the downlink.

Figure 26A:
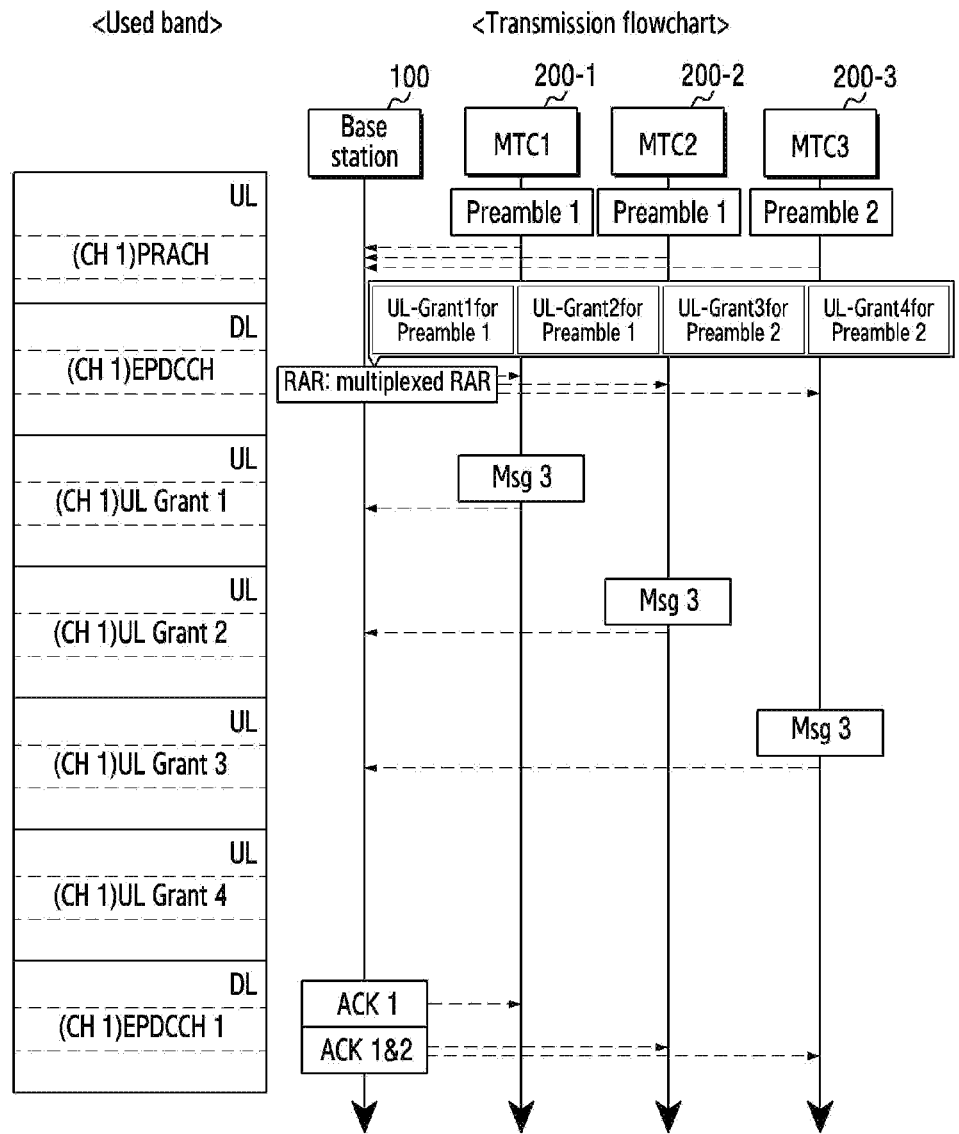
FIGS. 26A and 26B illustrate signal flow between a base station and terminals for transmitting a plurality of RAR messages through one downlink MTC channel corresponding to one PRACH in a wireless communication system according to an embodiment of the present disclosure.
Figure 26B:
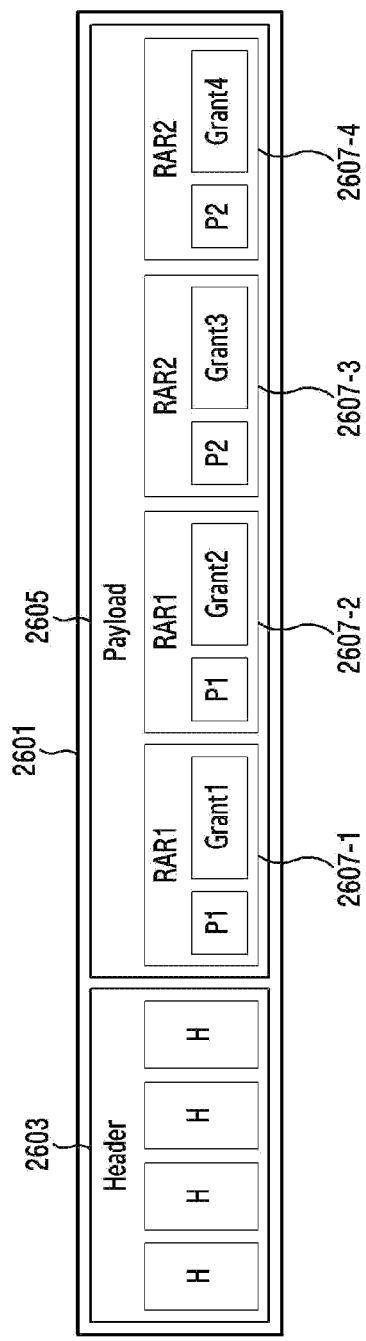

FIGS. 26A and 26B illustrate signal flow between a base station and terminals for transmitting a plurality of RAR messages through one downlink MTC channel corresponding to one PRACH in a wireless communication system according to an embodiment of the present disclosure.

Referring to FIG. 26A, the base station 100 may receive a random access preamble from each of a plurality of MTC terminals through a single channel in an uplink. For example, the base station 100 may receive a random access preamble 1 from a MTC terminal 1 (200-1), a random access preamble 1 from a MTC terminal 2, and a random access preamble 2 from a MTC terminal 3 through a PRACH of a CH 1 in the uplink.

The base station 100 may transmit a multiplexed RAR to the MTC terminals 200-1 to 200-3 in response to the random access preambles received from the MTC terminals 200-1 to 200-3. For example, the base station 100 may transmit, to the MTC terminals 200-1 to 200-3, a MAC frame in which a plurality of pieces of grant information is allocated for one random access preamble.

Referring to FIG. 26B, a header 2603 of the MAC frame 2601 may include information on the RARs 2607-1 through 2607-4. A payload 2605 of the MAC frame 2601 may include a RAR 1 (2607-1) and a RAR 1 (2607-2), in which different pieces of grant information are allocated for the random access preamble 1. For example, the RAR 1 (2607-1) may include information indicating that a Grant 1 is allocated for the random access preamble 1. The RAR 1 (2607-2) may include information indicating that a Grant 2 is allocated for the random access preamble 1. Further, the RAR 2 (2607-3) may include information indicating that a Grant 3 is allocated for the random access preamble 2. In addition, the RAR 2 (2607-4) may include information indicating that a Grant 4 is allocated for the random access preamble 2.

That is, the base station 100 may allocate RAR messages that are assigned one channel in a downlink in response to the random access preambles received through one channel in the uplink.

The MTC terminal 1 (200-1) transmits a msg3 through the CH 1 in the uplink according to the Grant 1 included in the RAR 1 (2607-1). The MTC terminal 2 (200-2) transmits a msg3 through the CH 1 in the uplink according to the Grant 2 included in the RAR 1 (2607-2). The MTC terminal 3 (200-3) transmits a msg3 through the CH 1 in the uplink according to the Grant 3 included in the RAR 2 (2607-3).

The base station 100 transmits an ACK 1 to the MTC 1 (200-1) through an EPDCCH 1 of a CH 1 in the downlink. Also, the base station 100 transmits an ACK 1 and an ACK 2 to the MTC 2 (200-2) and the MTC 3 (200-3) through the EPDCCH 1 of the CH 1 in the downlink.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

Although specific exemplary embodiments have been described in the detailed description of the present disclosure, various change and modifications may be made without departing from the spirit and scope of the present disclosure. Therefore, the scope of the present disclosure should not be defined as being limited to the embodiments, but should be defined by the appended claims and equivalents thereof.

The invention claimed is:

1. A method for operating a terminal in a wireless communication system, the method comprising:
    transmitting a random access preamble selected from a plurality of random access preambles to a base station;
    receiving at least one message comprising a plurality of multiplexed random access responses corresponding to the selected random access preamble and information on the plurality of multiplexed random access responses; and
    identifying the plurality of multiplexed random access responses based on the information on the plurality of multiplexed random access responses,
    wherein the at least one message including uplink data allocation information corresponding to the random access preamble is generated based on a correlation value that is determined for the random access preamble.

2. The method of claim 1, further comprising:
    selecting one random access response from the identified plurality of multiplexed random access responses; and
    transmitting a msg3 message through a channel resource corresponding to the selected random access response.

3. The method of claim 1, further comprising:
    receiving the at least one message through a downlink channel of a channel different from a channel used to transmit the selected random access preamble.

4. The method of claim 1, wherein receiving the at least one message comprises detecting the at least one message included in one frame.

5. The method of claim 1, wherein receiving the at least one message comprises detecting the at least one message included in each of a plurality of frames.

6. An apparatus of a base station in a wireless communication system, the apparatus comprising:
a transceiver; and
at least one processor operably coupled to the transceiver and configured to:
receive at least one random access preamble from at least one terminal,
generate at least one message comprising a plurality of multiplexed random access responses corresponding to the at least one random access preamble and information on the plurality of multiplexed random access responses for identifying the plurality of multiplexed random access responses, and
transmit the at least one message,
wherein the at least one processor is further configured to:
determine a correlation value for each of the at least one random access preambles, and
generate the at least one message including uplink data allocation information corresponding to each of the at least one random access preamble based on the correlation value.

7. The apparatus of claim 6, wherein the transceiver is further configured to broadcast system information comprising at least one of a number of allocated channels and a channel identifier for machine-to-machine communication associated with the at least one random access preamble.

8. The apparatus of claim 6, wherein the at least one processor is further configured to determine a number of a plurality of multiplexed random access responses corresponding to each of the at least one random access preamble.

9. The apparatus of claim 6, wherein the at least one processor is further configured to generate the at least one message comprising a plurality of different pieces of the uplink data allocation information corresponding to the at least one random access preamble.

10. The apparatus of claim 6, wherein the at least one processor is further configured to generate one frame including the at least one message.

11. The apparatus of claim 6, wherein the at least one processor is further configured to generate a plurality of different frames including the at least one message.

12. The apparatus of claim 6, wherein the at least one processor is further configured to:
determine a received signal strength for each of the at least one random access preamble; and
generate the at least one message including the uplink data allocation information corresponding to each of the at least one random access preamble based on the received signal strength.

13. The apparatus of claim 6, wherein the at least one processor is further configured to generate the at least one message based on an amount of resources used by the base station and a service quality of the base station.

14. The apparatus of claim 6, wherein the at least one processor is further configured to transmit the at least one message through at least one downlink channel.

15. An apparatus of a terminal in a wireless communication system, the apparatus comprising:
a transceiver; and
at least one processor operably coupled to the transceiver and configured to:
transmit a random access preamble selected from a plurality of random access preambles to a base station,
receive at least one message comprising a plurality of multiplexed random access responses corresponding to the selected random access preamble and information on the plurality of multiplexed random access responses, and
identify the plurality of multiplexed random access responses based on the information on the plurality of multiplexed random access responses,
wherein the at least one message including uplink data allocation information corresponding to the random access preamble is generated based on a correlation value that is determined for the random access preamble.

16. The apparatus of claim 15, wherein the at least one processor is further configured to:
select one random access response from the identified plurality of multiplexed random access responses, and
transmit a msg3 message through a channel resource corresponding to the selected random access response.

17. The apparatus of claim 15, wherein the at least one processor is further configured to receive the at least one message through a downlink channel of a channel different from a channel used to transmit the selected random access preamble.

18. The apparatus of claim 15, wherein the at least one processor is further configured to detect the at least one message included in one frame.

19. The apparatus of claim 15, wherein the at least one processor is further configured to detect the at least one message included in each of a plurality of frames.

* * * * *